United States Patent
Kim et al.

(10) Patent No.: US 9,203,947 B2
(45) Date of Patent: Dec. 1, 2015

(54) MESSAGE SERVICE SUPPORT METHOD AND PORTABLE DEVICE USING THE SAME

(75) Inventors: Keun Young Kim, Seoul (KR); Jang Hyeon Jo, Gyeonggi-do (KR); Ho Kim, Seoul (KR); So Young Kim, Seoul (KR); Young Kyung Ahn, Seoul (KR); Min Seung Song, Seoul (KR); Sung Youn An, Gyeonggi-do (KR); JI Young Han, Seoul (KR); Jee Won Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1197 days.

(21) Appl. No.: 12/685,052

(22) Filed: Jan. 11, 2010

(65) Prior Publication Data
US 2010/0178947 A1    Jul. 15, 2010

(30) Foreign Application Priority Data
Jan. 12, 2009    (KR) .................. 10-2009-0002392

(51) Int. Cl.
*H04W 4/00* (2009.01)
*H04M 1/725* (2006.01)
*H04L 12/58* (2006.01)
*H04W 4/12* (2009.01)

(52) U.S. Cl.
CPC ....... *H04M 1/72552* (2013.01); *H04L 12/5895* (2013.01); *H04M 1/72583* (2013.01); *H04M 2250/22* (2013.01); *H04M 2250/70* (2013.01); *H04W 4/12* (2013.01)

(58) Field of Classification Search
CPC .. G06F 3/041; G06F 3/04883; G06F 3/04886
USPC .......................................... 455/466, 563, 566
See application file for complete search history.

(56) References Cited

U.S. PATENT DOCUMENTS

| | | | |
|---|---|---|---|
| 2005/0081150 A1* | 4/2005 | Beardow | 715/531 |
| 2006/0041627 A1* | 2/2006 | Tu | 709/206 |
| 2007/0049358 A1 | 3/2007 | Kang et al. | |
| 2008/0174568 A1* | 7/2008 | Kim | 345/173 |
| 2009/0005011 A1* | 1/2009 | Christie et al. | 455/412.2 |
| 2010/0035658 A1* | 2/2010 | Lee | 455/566 |

FOREIGN PATENT DOCUMENTS

KR   10-2007-0097271 A   10/2007
KR   10-2008-0068495 A   7/2008

* cited by examiner

*Primary Examiner* — Kwasi Karikari
(74) *Attorney, Agent, or Firm* — Cha & Reiter, LLC

(57) ABSTRACT

Provided is a message service providing method and portable device supporting the same, which includes generating at least one of a key input signal and a sliding sensor signal; and writing a message by activating a message write window set according to an environment of an application program which is being activated depending on generation of at least one of the key input signal and the sliding sensor signal.

25 Claims, 19 Drawing Sheets

Picture/Video Gallery

< 311 >

QWERTY KEY INPUT →

< 313 >

[ MSG ] hot Key →

< 315 >

< 291 >                < 293 >

MESSAGE SERVICE SUPPORT METHOD AND PORTABLE DEVICE USING THE SAME

CLAIM OF PRIORITY

This application claims the benefit of the earlier filing date, pursuant to 35 USC 119, of that patent application entitled "MESSAGE SERVICE SUPPORT METHOD AND PORTABLE DEVICE USING THE SAME" filed in the Korean Intellectual Property Office on Jan. 12, 2009 and assigned Serial No. 10-2009-0002392, the contents of which are incorporated herein by reference.

BACKGROUND OF THE INVENTION

1. Field of the Invention

The present invention relates to a message servicing, and more particularly, to a method and a portable device supporting the same, which is capable of supporting message service and adjusting a message write window according to the application program which is being activated.

2. Description of the Related Art

Portable devices are widely used in everyday applications based on their small size and portability. Such a conventional portable device can have a MP3 function, corresponding to a file playing function, or can have a digital camera function, corresponding to and image collection function. Moreover, the conventional portable device, may support one or more functions that can perform a mobile game or an arcade game or the like. Among the functions of the conventional portable device, the message service function is one of the most general and widely used services.

The message service function is a function for writing a message by inputting a character (alphanumeric, symbol, numeric, etc.) by making use of a keypad included within in the portable device (or vocal inputs), and transmitting the written message to other portable devices.

However, the conventional message service function is inconvenient in the usage of the service although it is frequently used. That is, when user uses the message service function, the user must perform the process of selecting the message service function from a menu, activating the message write window, writing a message in the activated message write window, and then, transmitting the written message to one or more portable devices. As would be appreciated, the process described above must be repetitively performed whenever a new message is to be transmitted when the message service is used.

Accordingly, it is difficult to provide the portable device user with a fast message service while reducing the inconvenience due to the process reiteration.

SUMMARY OF THE INVENTION

In accordance with an aspect of the present invention, a method of providing a message service includes: generating at least one of an input signal and a sliding sensor signal; and writing a message by activating a message write window set according to an environment of an application program which is being activated depending on generation of at least one of the input signal and the sliding sensor signal.

In accordance with another aspect of the present invention, a portable device that provides a message service function includes: an input unit which includes at least one of a keypad that generates a key input signal, and a key map that generates a key input signal according to a touch event; a controller which controls an output of a message write window that is set according to an environment of an application program activated according to a generation of the key input signal; a storage unit which stores the application program and the key map; and a display unit which outputs the message write window.

In accordance with another aspect of the present invention, a portable device that provides a message service function includes: a slide sensor which detects a sliding sensor signal according to sliding operation; a controller which controls an output of a message write window set according to an environment of application program that is being activated depending on a generation of the sliding sensor signal; a storage unit which stores the application program and a key map; and a display unit that outputs the message write window.

According to the message service providing method and a portable device supporting the same, various message service functions can be used more rapidly and conveniently.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

The meaning of terms is clarified in this disclosure, so the claims should be read with careful attention to these clarifications. Specific examples are given, but those of skill in the relevant art will understand that other examples may also fall within the meaning of the terms used, and within the scope of one or more claims. Terms do not necessarily have the same meaning here that they have in general usage, in the usage of a particular industry, or in a particular dictionary or set of dictionaries. In the event of an irresolvable conflict between a term's meaning as used expressly herein and the term's meaning as used in an incorporated document, the express meaning herein governs. Although this disclosure and the associated drawings fully detail several alternate preferred embodiments of the present invention, further alternate embodiments can be implemented without departing from the scope of this invention. Consequently, it is to be understood that the following disclosure is provided for exemplary purposes only and is not intended as a limitation of the present invention. Furthermore, all alternate embodiments which are obvious modifications of this disclosure are intended to be encompassed within the scope of the present invention.

Hereinafter, a keypad or a key map is illustrated as a QWERTY keypad or a QWERTY key map, but the present invention is not limited to this. That is, not only the QWERTY keypad and the QWERTY key map, but also other keypad and key map, for example, the 3*4 keypad or key map, 4*3 keypad or key map are applicable to the present invention, and other types of keypad or key map also can be applicable.

Figure 1:
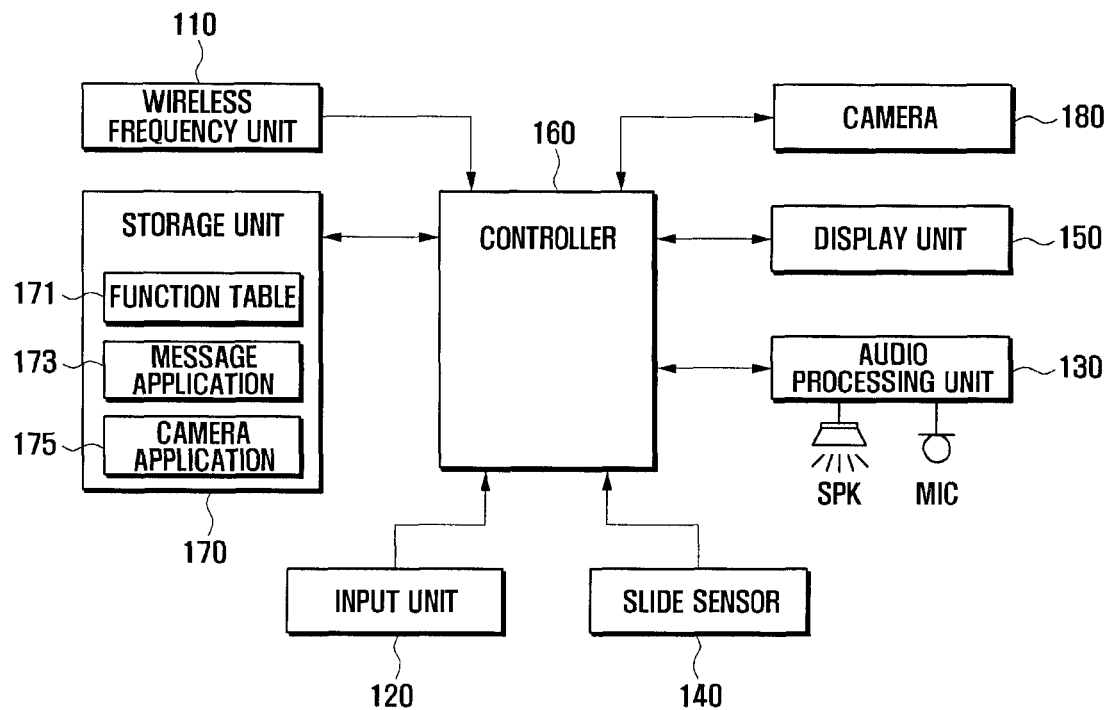
FIG. 1 is a block diagram illustrating a schematic configuration of a portable device according to the present invention.

FIG. 1 is a block diagram illustrating a schematic configuration of a portable device 100 according to the present invention;

Referring to FIG. 1, the portable device 100 of the present invention includes a wireless frequency unit 110, an input unit 120, an audio processing unit 130, a slide sensor 140, a display unit 150, a storage unit 170, a camera 180, and a controller 160. Here, it is illustrated that the portable device 100 is equipped with a slide sensor 140, but the present invention is not limited solely to this type of device. That is, in case the portable device 100 is configured of a bar type, the slide sensor 140 can be omitted, and, the input unit 120 can be replaced with a touch sensor disposed in the front side of the display unit 150.

In case the input unit 120 is replaced with the touch sensor, the portable device 100 can store the QWERTY key map and output a display of the QWERTY key map to the display unit 150 according to a specific operation so that it can generate an input signal corresponding to the QWERTY key input, which is then sent to the controller 160. Moreover, even in case the portable device 100 is configured of a slide type and has a form that the input unit 120 which has the QWERTY keypad=is exposed, it can prepared a touch sensor in the display unit 150, and can use the display unit 150 as an input unit function by outputting the pertinent QWERTY key map to the display unit 150 according to a user's request.

When a key input is generated from the QWERTY keypad prepared in the input unit 120, or when a sliding sensor signal according to the sliding operation of the portable device 100 is generated, the portable device 100 sends the key input or the corresponding generated signal to the controller 160. The controller 160 supports the message application (message-.APP) for supporting the message service function to operate in connection with an application which is being performed, with reference to a function table 171 which is stored in the storage unit 170. Accordingly, the portable device 100 user can directly use the message service function among various function application of the portable device 100, and can easily edit messages and use the message service function in connection with various functions. Each configuration of the portable device will be illustrated in detail.

The wireless frequency unit 110 performs the formation of at least one of providing a communication channel for voice communications and for the transmission of data such as an image under the control of the controller 160. That is, the wireless frequency unit 110 forms the voice communication channel or, the data communication channel and the video communication channel between mobile communications systems.

To this end, the wireless frequency unit 110 can include a wireless frequency transmitter (not shown) which up-converts and amplifies a frequency of a signal to be transmitted, and a wireless frequency reception unit (not shown) which low-noise amplifies a received signal and down-converts the frequency of the received signal to extract the data content. Particularly, the wireless frequency unit 110 can form a data transmission channel for the support of a message service function. Such a data transmission channel may be temporarily formed so as to transmit the written message service to the mobile communications systems at the time of transmission and can be canceled when the message is transmitted is completed. The message transmitted through the data transmission channel can be a short message, a multimedia message, an instant massage, an E-mail or other similar messages.

The input unit 120 includes a plurality of input keys and function keys for receiving number or character information and setting various functions. The function keys can include a direction key, a side key, and a shortcut key which are set to perform a specific function. Moreover, the input unit 120 generates a key signal related to the user's settings and the function control of the portable device 100 and sends signals associated with the input values to the controller 160.

Particularly, the input unit 120 of the present invention is implemented by a QWERTY keypad, a 3*4 keypad, a 4*3 keypad including a plurality of keys. This input unit 120 can generate an input signal for selecting at least one among various applications stored in the storage unit 170, an input signal for writing a message in the message service function, and an input signal for transmitting a message. The audio processing unit 130 includes a speaker (SPK) for playing audio data transmitted and received in the call and a microphone (MIC) for collecting the voice or other audio signal of user in the call. Particularly, the audio processing unit 130 of the present invention can output an operation sound according to the state of the portable device 100. Moreover, the audio processing unit 130 can output a sound which informs a user of the activation of message service functional which is performed according to the operational state of the portable device.

The slide sensor 140 is arranged between a first assembly and a second assembly of the portable device 100 and detects a signal according to the sliding operation. Such a slide sensor 140 can be arranged between the first assembly and the second assembly with a mechanical structure having a switch type. Various sensors capable of sensing the sliding operation of the first assembly and the second assembly will be applicable to the slide sensor 140 (see FIG. 2).

That is, in case the first assembly slides from the front side of the second assembly, the slide sensor 140 senses the sliding open state as the is turned on. On the other hand, in a structure where the rear side of the first assembly faces the front side of the second assembly, the switch is turned off and can sense the sliding engagement state. Moreover, the slide sensor 140 is arranged in one side of the front side of the second assembly by an optical sensor and can detect the sliding operation based on the reception of the light received in a light reception unit according to the sliding operation of the first assembly. In other words, various sensors capable of sensing the sliding operation of the first assembly and the second assembly will be applicable to the slide sensor 140.

The display unit 150 displays the information which a user inputs or the information provided to a user as well as various menus of the portable device 100. That is, the display unit 150 can provide various screens according to the usage of portable device 100, for example, the stand-by screen, the menu screen, the message writing screen, and the call screen. Particularly, when displaying a screen according to the activation of a specific application, if a QWERTY key input is generated from the QWERTY keypad of the input unit 120, or if a sliding sensor signal according to the sliding operation of the portable device 100 is generated, the display unit 150 of the present invention can output a screen according to the activation of message service functional. At this time, the display unit 150 can support an environment for a message service function under the control of the controller 160, and can support other environments according to the application which is being activated.

In the meantime, the display unit 150 can be implemented by a liquid crystal display (LCD), and, in case the LCD is configured in the form of a touch screen, the display unit 150 can be included in the input means. To this end, the display unit 150 can prepare a display panel and a touch sensor arranged on the display panel. The portable device 100 can provide various menu screens which can be executed based on the touch screen as the display unit 150 supports a touch screen.

In case the display unit 150 is implemented by the touch screen, the portable device 100 can store a QWERTY key map, and can control the generation of an input signal for the activation of the QWERTY key map and to activate a message write window depending on the sliding sensor signal according to the sliding operation. The display unit 150 can output a touchable icon to a certain area so as to generate an input signal for the activation of the QWERTY key map. Moreover, the portable device 100 can control to the output of the QWERTY key map to the display unit 150 if a sensor signal is detected from the slide sensor 140.

The storage unit 170 can store an application for the operation of the slide sensor, an application for playing various stored files, and a key map or menu map for the operation of touch screen, as well as one or more applications for the operation of a corresponding functions according to an exemplary embodiment of the present invention. Here, the key map and the menu map can have various types. That is, the key map can be a keyboard map, a 3*4 key map, or a QWERTY key map, and can be a control key map for the operational control of the application being activated. Moreover, the menu map can be a menu map for the operation control of the application being activated, and can be a menu map, which has various menus that the portable device provides as an item. Such a storage unit 170 can include a program area and a data area.

The program area can store an operating system (OS) for the booting of the portable device 100 and the operation of each configuration of the portable device 100 and an application for playing various file, for example, an application for the support of a call function, a web browser application for accessing to internet server, an MP3 application for playing various media materials, an image output application for displaying photo, and a moving picture playing application, for example. In addition, the program area of the present invention can store an application for the operation of the slide sensor 140, an application for using a touch sensor included in the touch screen, a message application 173 for the support of message service function, and a camera application (camera.App) 175 for the operation of camera.

The message application (message.App) supports different environments according to the application being activated under the control of the controller 160. The screen according to the activation of a message application (message.App) is illustrated in detail with reference to drawings (FIG. 6 to FIG. 20). The data area is an area in which data generated according to the use of portable device 100 is stored, and various contents can be stored. Moreover, in case the display unit 150 is implemented by a touch screen, the data area can store a user input inputted through the touch screen. Particularly, the data area of the present invention stores a function table. The function table is a table that defines the operational control of a message application (message.App) of the portable device 100 according to the QWERTY key input, which is generated by the QWERTY keypad or the QWERTY key map or the generation of a sliding sensor signal according to the sliding operation of the portable device 100.

For example, the function table includes commands that control the activation of the message application if a QWERTY key input is generated from the QWERTY keypad contained in the input unit 120 or the QWERTY key map which can be shown in the display unit 150, or if a sliding sensor signal according to the sliding operation of the portable device 100 is generated. At this time, the function table can include commands that control the output of a message service support window having different environments according to the kind of application being performed. The application activation or control based on such a function table is illustrated in detail with the description of message application (message.App).

The camera 180 collects an image corresponding to a subject under the control of a user. Such a camera 180 includes a camera sensor that takes a picture of an image photographed through a lens, and converts a photographed optical signal into an electric signal, and a signal processing unit which converts an analog image signal photographed from the camera sensor into digital data. Here, a charge coupled device (CCD) sensor can be applied to the camera sensor, and the signal processing unit can be implemented by the digital signal processor (DSP), but it is not limitative. The camera 180 can send the collected image to the display unit 150 with a preview type.

The controller 160 controls the electric power supply to each configuration of the portable device 100 and supports to perform an initialization process, and can control the flow of each signal so that the message service function of the present invention may be supported to each configuration such as the wireless frequency unit 110, the input unit 120, the audio processing unit 130, the slide sensor 140, the display unit 150, the storage unit 170, the camera 180, and the controller 160 when the initialization process is completed.

Figure 2:
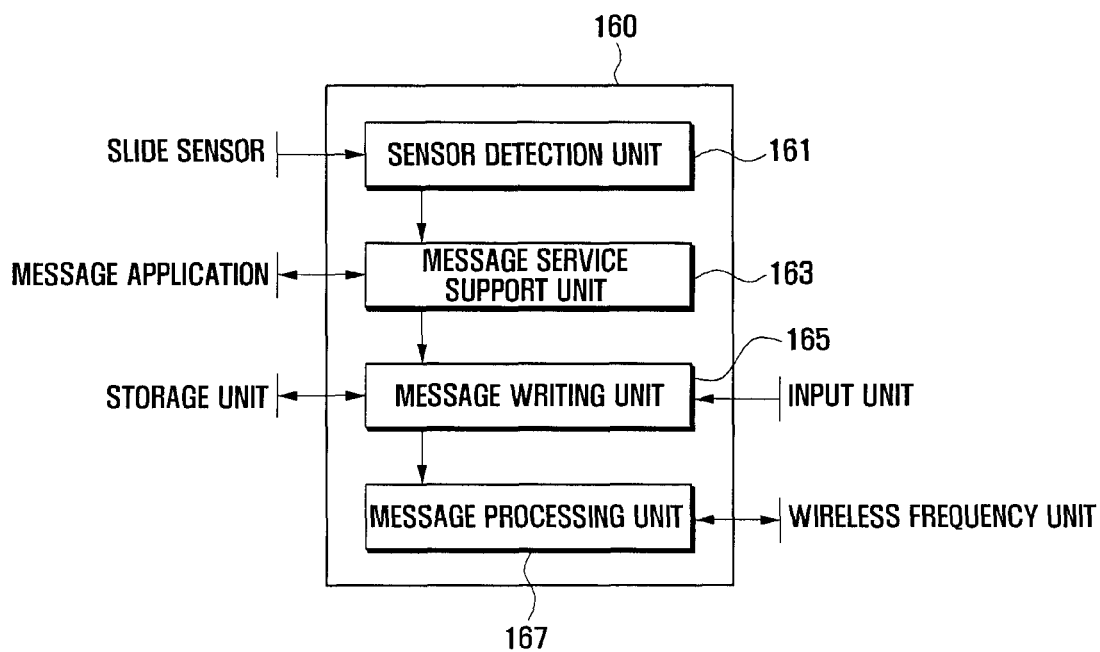
FIG. 2 is illustrates a detailed configuration of the controller of FIG. 1.

FIG. 2 illustrates the controller 160 including a sensor detection unit 161, a message service support unit 163, a message writing unit 165, and a message processing unit 167. The sensor detection unit 161 monitors the slide sensor 140 and detects a sensor signal generated by the operation of the portable device 100. And, the sensor detection unit 161 transmits the detected sensor signal to the message service support unit 163.

The message service support unit 163 controls the reading of a pertinent message application (message.App) from the storage unit and activates, when a QWERTY key input is generated from the QWERTY keypad contained in the input unit 120 or the QWERTY key map shown on the touch screen, or when receiving a sliding sensor signal according to the sliding operation from the sensor detection unit 161. In this process, the message service support unit 163 checks the application being performed, and can control the message service function according to the activation of the message application (message.App) and adjusted to the application being performed.

For example, if a camera application is being activated, and it is determined that a QWERTY key input is generated or a sliding sensor signal according to the sliding operation of the portable device is generated, the message service support unit 163 can control the sizing of a message write window based on an image collected by the camera when the message application (message.App) is activated.

Further, if the photograph search function is activated, and a QWERTY key input signal or a sliding sensor signal is received, the message service support unit 163 can generate a message write window based on a photograph which is being searched. That is, the message service support unit 163 controls the opening of a multimedia message write window that includes a photograph which is being searched as an attachment file, or can control the opening of a message write window that can input text on the photograph which is being searched.

In the meantime, if the message service support unit 163 receives a sensor signal that indicates that the operation state of the portable device 100 is a slide open state from the sensor detection unit 161, the controller 160 can control the output of the QWERTY key map to the display unit 150, or control the opening of a message write window when a QWERTY key input signal is generated from the QWERTY key map. And, if the message service support unit 163 receives a sensor signal according to the slide engagement state, the controller 160 can terminate the message application being activated, depending upon a termination signal.

That is, the message service support unit 163 determines the activation of the message application in case a specific character is inputted to, or a message is written, in the message write window which is currently executed, and can control the termination a message application and remove the message write window in case an additional input is not performed.

The message writing unit 165 writes a message based on a message write window activated by the message service support unit 163, a user input signal selecting the contents stored in the storage unit, the character or number input signal sent from the input unit 120. And the message writing unit 165 can send the written message to the message processing unit 167. Moreover, the message writing unit 165 can open an input window for inputting a telephone number, for example, of other portable devices according to user's request. The message processing unit 167 controls the transmission of the message sent from the message writing unit 165 to other portable devices through a wireless frequency unit (110). Moreover, the message processing unit 167 can process a message received from message service center of mobile communications system and can control the output of the message to the display unit 150 or to store the message in the storage unit 170.

Figure 3:
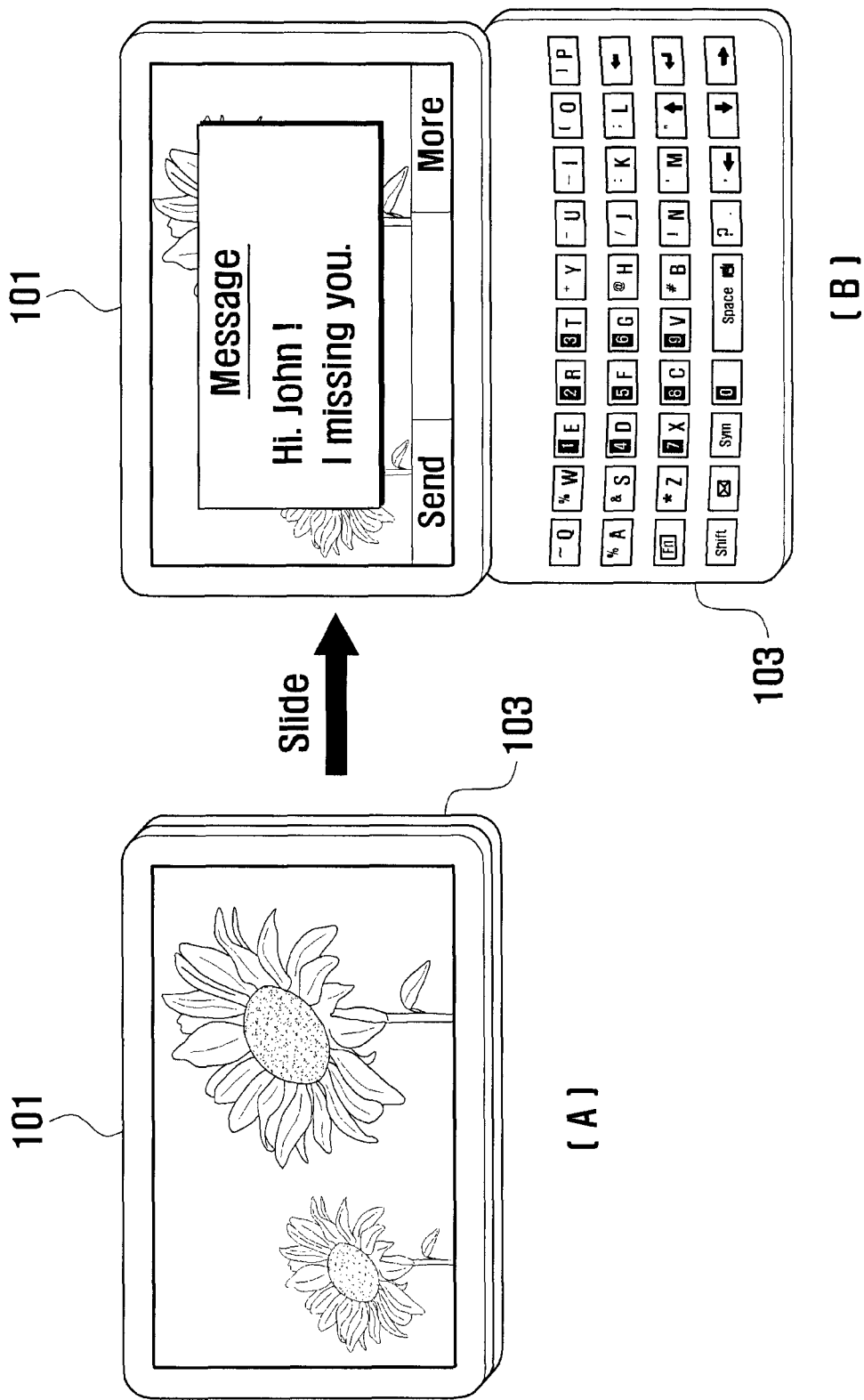
FIG. 3 illustrates a slide type portable device according to an exemplary embodiment of the present invention.

FIG. 3A is a drawing schematically illustrating a shape of a portable device of slide type supporting the message service function according to an exemplary embodiment of the present invention;

Referring to FIG. 3, the portable device 100 of the present invention has a structure where it is opened and combined as a slide type, while an input unit is configured of QWERTY keypad or 3*4 keypad. In more detail, if the portable device 100 includes a first assembly 101 and a second assembly 103, a structure for sliding the first assembly with respect to the second assembly may be formed to open the portable terminal 100 as shown in FIG. 3B. In the first assembly 101, a display unit is formed, and an input unit can be formed in the second assembly 103. Accordingly, as shown in FIG. 3A, the rear side of the first assembly 101 is arranged to fully face the front side of the second assembly 103 in the state of sliding combination, so that the portable device 100 can have a structure in which only the display unit is shown in appearance. As shown in FIG. 3B, in the state where it is opened with by sliding the second assembly 103 from the first assembly 101, in the portable device 100, for example, in an upper direction so that a QWERTY keypad which is an input unit contained in the front side of the second assembly 103 is exposed.

At this time, the terminal has a structure where a certain area is connected so that the first assembly 101 and the second assembly 103 may not be separated.

Accordingly, the portable device 100 of the present invention can semi-automatically perform the sliding operation by a force of pushing the first assembly 101 to the upward direction or in a lower direction. The portable device 100 can include a sensor which can sense the state of the terminal according to the sliding operation.

The portable device 100 may send a sensing signal according to the sliding state of the terminal to the controller, so that the controller can control the device according to the sliding state. For example, the controller can cancel a sleep state or provide an image of a QWERTY key map to the display unit. The portable device can support the performance of a message service function when activated if a QWERTY key input is generated from the QWERTY keypad or the qwerty key map outputted to the display unit.

In the meantime, if the operation that the first assembly 101 and the second assembly 103 are changed from the state where the first assembly 101 and the second assembly 103 are combined into the state where the first assembly 101 and the second assembly 103 are opened (i.e., a sliding operation signal is generated), the portable device 100 can detect a corresponding sensor signal, and activate a corresponding message write window based on the sensor signal. At this time, the portable device 100 can check the environment of application program being activated with reference to the function table stored in the storage unit, and open a message write window corresponding to the current environment.

Figure 4:
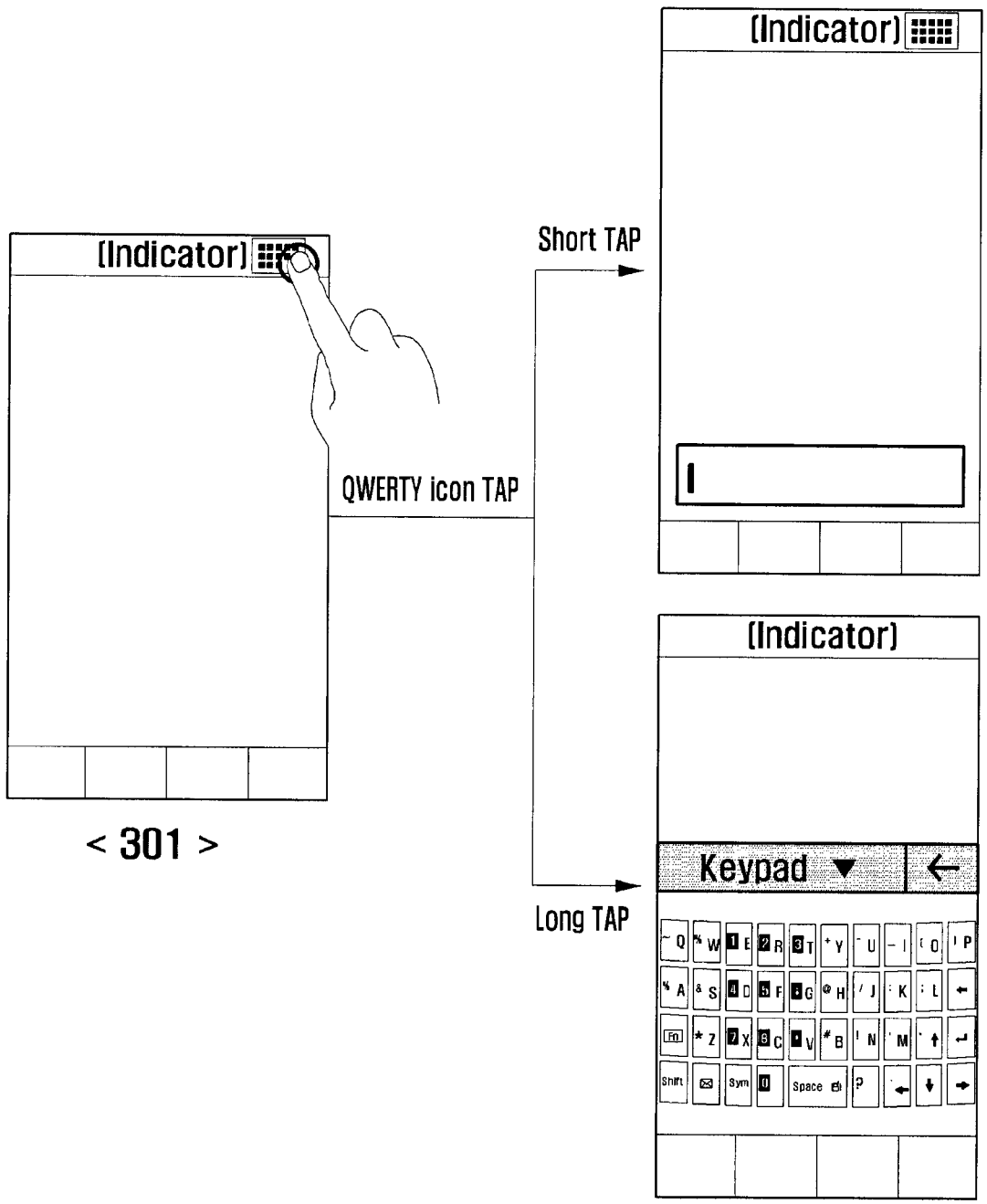
FIG. 4 illustrates an example of an interface of a bar type portable device according to an exemplary embodiment of the present invention.

FIG. 4 illustrates an interface of a portable device of a bar type supporting a message service function according to an exemplary embodiment of the present invention.

Referring to FIG. 4, as shown in screen 301, the portable device of the present invention can output an icon that can refer to a virtual QWERTY key map to an indicator area on the display unit. Accordingly, if a QWERTY key input is necessary, the portable device user may activate a QWERTY key map icon prepared in the indicator area, so that the portable device user can use the virtual QWERTY key map. To this end, the portable device can store the QWERTY key map in the storage unit. And in case a user activates the icon, the portable device detects the activation signal and searches for the QWERTY key map in the storage unit. The QWERTY key map is then output to the display unit while a touch sensor can be initialized so that character inputs may be possible based on the QWERTY key map.

In screen 301, in case user generates a touch event with respect to the icon outputted to the indicator area by a shot tap, the portable device can output an input window in which a text input is possible with regard to the application being activated, as shown in screen 303. And, in screen 301, in case user generates a touch event with respect to the icon outputted to the indicator area by a long tap (i.e., for a period of time greater than a known time period), the portable device can control the output of the display to show a QWERTY key map, as shown in screen 305. At this time, the portable device temporarily can stop or terminate the application which is previously activated, and to output a message write window wherein a message can be input through virtual qwerty keypad to the display unit. User can perform a character input by touching the QWERTY key map. The portable device can present the inputted character to the message write window positioned at the upper portion of the QWERTY key map.

As illustrated in the above, the portable device for the support of message service according to an embodiment of the present invention controls an activation message write window according to the generation of QWERTY key input signal, and can adaptively output an appropriate screen according to an application being performed, in the activation of message write window. Then, the message service providing method according to an exemplary embodiment of the present invention is illustrated in detail with reference to FIG. 5.

Figure 5:
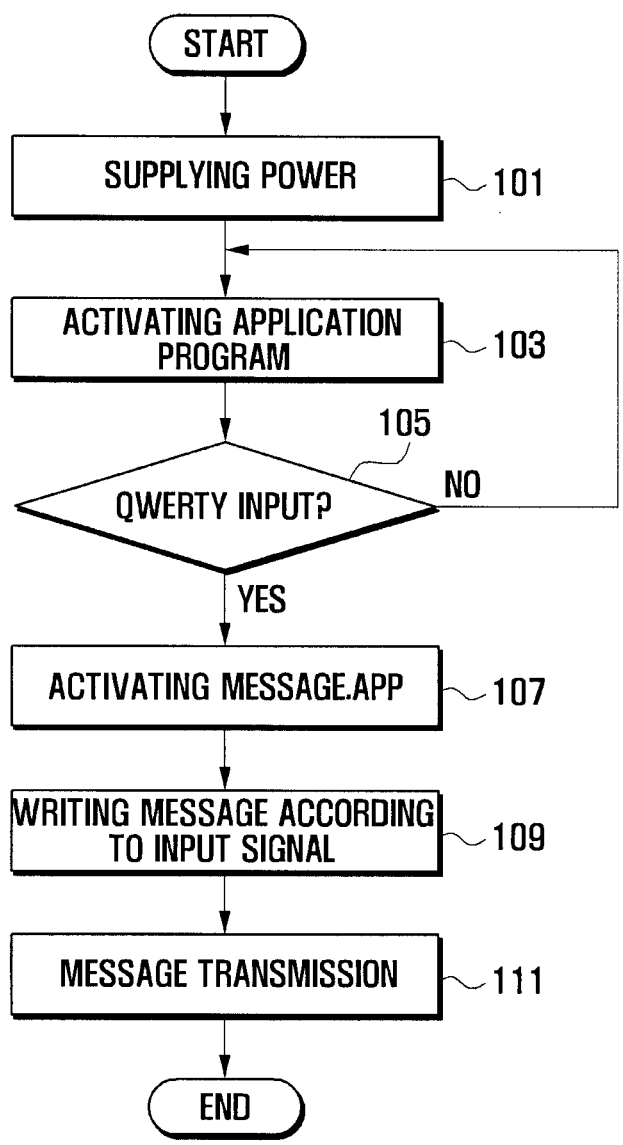
FIG. 5 is a flowchart illustrating a message service providing method according to an exemplary embodiment of the present invention.

FIG. 5 is a flowchart illustrating a message service providing method according to an exemplary embodiment of the present invention.

Referring to FIG. 5, if power is supplied to the portable device (101), the controller performs the booting process of the portable device using the provided power, and then controls an initialization process of each configuration such as the initialization of hardware and operational software. Booting processes are well-known in the art and need not be discussed in detail herein.

Then, the controller can activate a preset application (103). For example, the controller can activate an application for the output of stand-by screen, for example, or the controller can activate an operation according to a user input. For example, the controller can activate an application for the operation of a camera function or an application for the search of a photograph according to a user's input.

The controller checks whether a QWERTY key input signal is generated (105). In more detail, in case the portable device is a slide type, in the structure of slide type where the first assembly and the second assembly are arranged to face each other (closed position), user can provide a physical force to slide the first assembly from the second assembly in a specific direction to open the device. A slide sensor contained in the portable device may then generate a sensor signal according to the openness of the terminal. At this time, the sensor detection unit of the controller can detect the slide openness based on a sensor signal sent from the slide sensor.

The controller can then perform a change of a state of the portable device, for example, and can cancel of a sleep state according to the sensor signal. In the portable device, the QWERTY keypad contained in the input unit is then exposed according to the slide opening, and the controller can determine the generation of QWERTY key input signal when a user clicks a specific key of the QWERTY keypad. On the other hand, the controller can output the QWERTY key map to the display unit according to the slide opening. In case when a touch event is generated by the QWERTY key map outputted to the display unit, the controller can determine the generation of QWERTY key input signal.

In case the portable device is formed with the bar type, the portable device can provide touch screen. At this time, the QWERTY key map can be outputted to the display unit. In this process, in case a separate QWERTY key input signal is not generated, controller can control the return to before step 103 and repeatedly execute following procedure.

In the meantime, if the controller detects a QWERTY key input signal (105), the controller activates a message application (message.APP) (107). The controller then outputs a screen for the support of a message service corresponding to the application being activated. The screen output for the support of message service is described later. The controller can control the performance of the message writing according to a signal inputted from the input unit (109).

The input signal can be character, number, or special character inputted from at least one key contained in the QWERTY keypad or a touch event generated on the QWERTY key map and can be an input signal for selecting content stored in the storage unit. Accordingly, the controller can output a character or number to the message write window of the display unit according to the input signal. In case the contents is selected, the controller can apply a screen corresponding to the selected content to the message write window and output it, or to apply an icon indicating the content to the message write window and output it. And the controller can the output of an input window which can receive the input of a telephone number of other portable device to which a message is to be transmitted or can receive the input of the name linked to the telephone number according to the user's input. When the message writing is completed (109), the controller activates the wireless frequency unit (see FIG. 1) so as to transmit the message written at step 111.

As illustrated in the above, the message service providing method according to an embodiment of the present invention activates the message service function according to the generation of a QWERTY key input signal, and, outputs the message write window to be adjusted to the environment of application program which is being activated.

In the description of FIG. 5 it was illustrated that the message write window is opened based on the generation of QWERTY key input signal. But, similar with the above method, the present invention can operate the opening of message write window according to the sliding state instead of the QWERTY key input signal. That is, if the sliding operation of the portable device is initiated, the portable device can detect a corresponding sensor signal. In case the sensor signal is generated, the portable device can begin the operation shown in FIG. 5 at block 107. That is, the process may activate a designated application (e.g., message.app) at step 107.

The present invention will be illustrated in detail with reference to an example of screen for the support of various message services according to an exemplary embodiment of the present invention. As referred to later, the generation of a QWERTY key input signal will be mainly illustrated among the generation of the QWERTY key input signal and the sensor signal according to the sliding operation.

That is, in the description, it is illustrated that the message write window is opened according to the generation of QWERTY key input signal. However, in the present invention, the message write window can be opened in the generation of sliding sensor signal according to the sliding operation of the terminal. In other words, the message write window can be opened according to the generation of at least one A key input signal and the sliding sensor signal.

Figure 6:
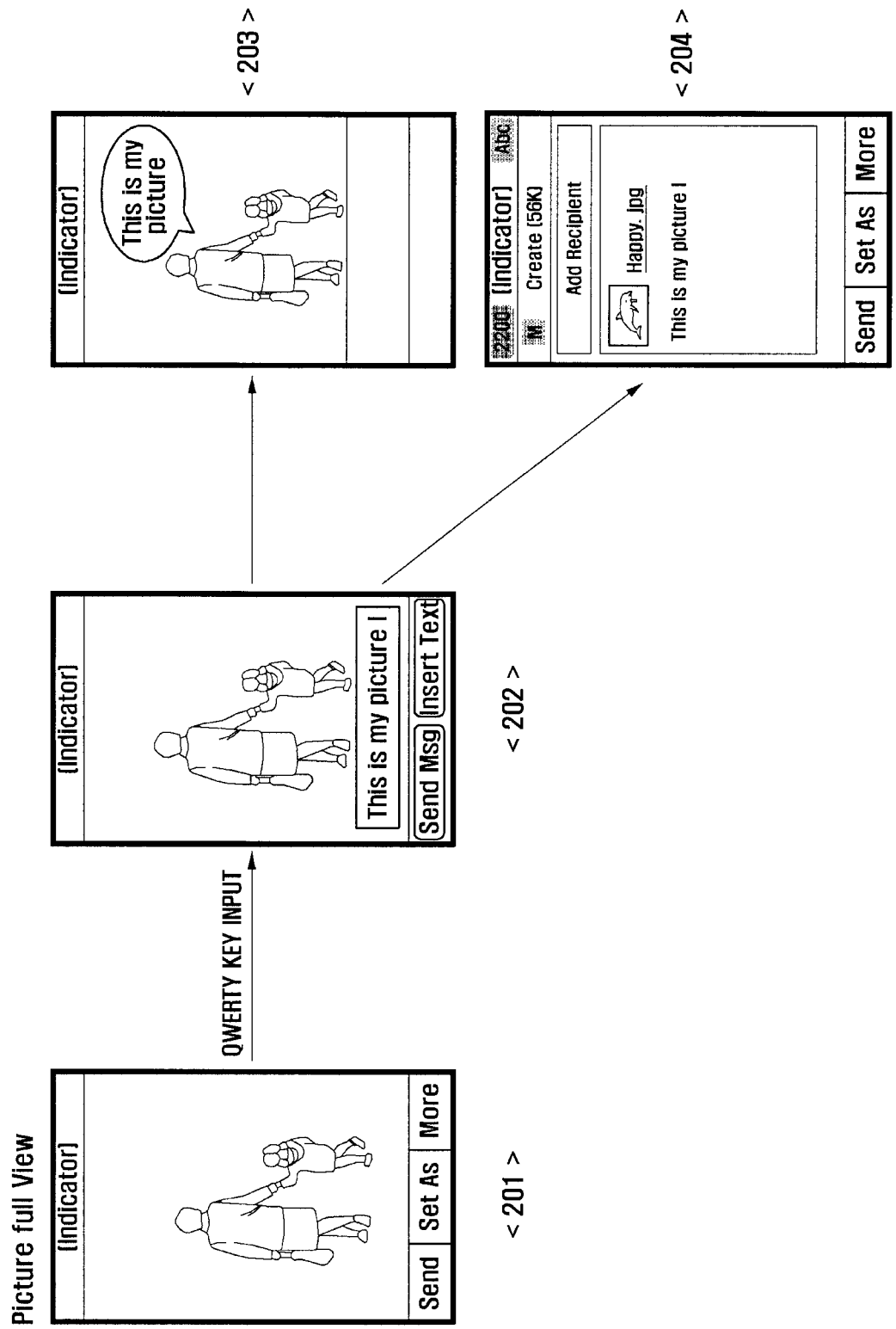
FIG. 6 illustrates an example of a screen for illustrating a message service function according to a first embodiment of the present invention.

FIG. 6 is an example of screen for illustrating the message service function according to a first embodiment of the present invention.

Referring to FIG. 6, according to user's input, the display unit of the portable device can output a specific photograph according to A photograph search as shown in screen 201. To this end, the portable device can output a menu screen for the photograph search. And in case a user activates the photograph search menu, the portable device can activate a corresponding photograph search application and can output a specific photographs stored in the storage unit with a multi-view screen. Then, the portable device can output a specific photograph selected by user with a full screen of the display unit. Then, in case user generates a QWERTY key input signal, the controller activates a message service application. As shown in screen 202, the controller outputs a message write window according to the activation of message application to be adjusted to the application being activated, (i.e., the photograph search application. That is, the message write window can be generated in a area of the lower portion of the display unit. According to a character key input signal inputted from the input unit, the controller can output the message "This is my picture" to the message write window.

When a specific photograph is outputted to a full screen of the display unit, the controller can c output, besides the message write window, a short key for transmitting a message to other portable devices, for example, "Send Msg" key and "Insert Text" corresponding to the text input short key, to the lower portion of the display unit. The short key outputted in this form can be activated by a touch event which is generated according to a touch of the user.

In case a touch event is generated in an "Insert Text" area, the controller can apply a sentence written in the message write window to a certain area of photograph screen 203. The written sentence can be selected according to, for example, a touch event, a drag event so that the sentence can be moved. The photograph including a sentence written like this can be applied as a multimedia message.

In case a touch event is generated in the "Send Msg" area, the controller can output an icon corresponding to the photograph outputted to the display unit to a certain area as shown in screen 204, and can output message write window which contains the sentence inputted to the message write window. Accordingly, the portable device user can additionally write text. If the message writing is completed in screen 203 and screen 204, as the controller controls the screen to allow for inputting the telephone number of other portable device, and can send the message based on the inputted telephone number.

In the meantime, in screen 202, the controller can output a short key that operates a timer for the transmission of messages or can cancel the transmission of separate messages. Accordingly, in case a user selects a message transmission cancel menu, or does not perform a separate operation before the timer is completed, the controller can support an edit function that applies the inputted sentence to the illustrated photograph.

Figure 7:
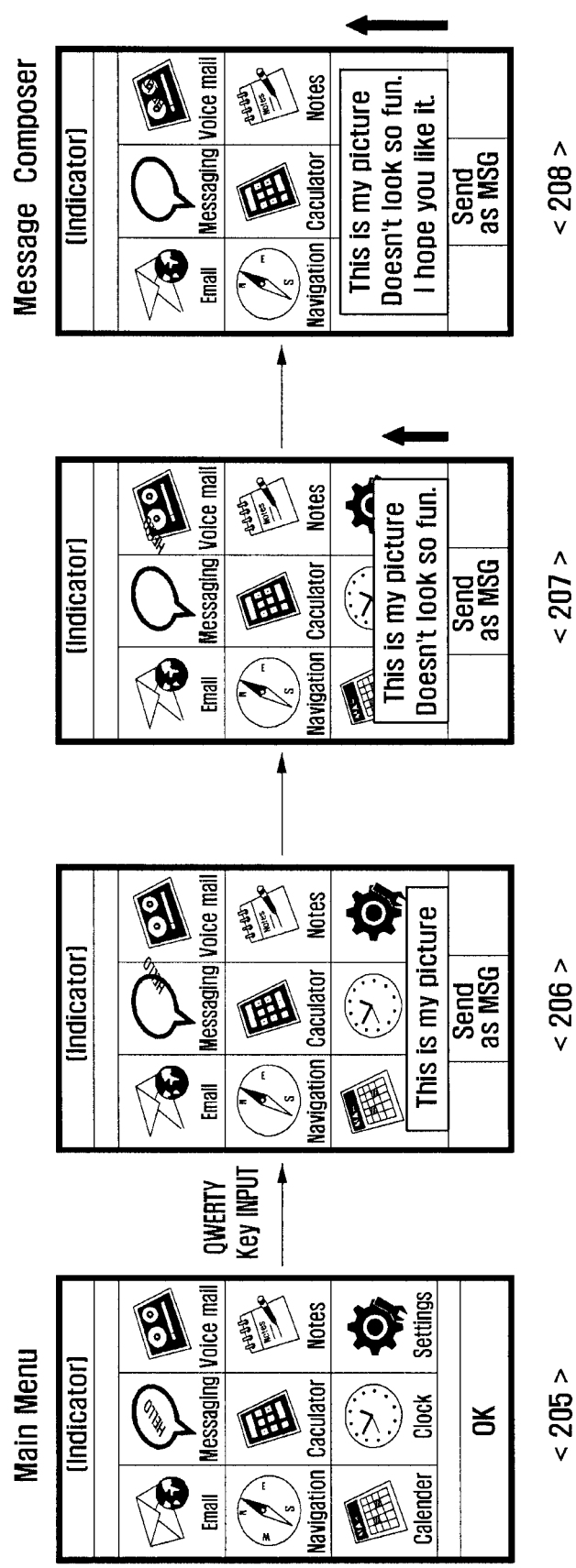
FIG. 7 illustrates an example of a screen for illustrating a message service function according to a second embodiment of the present invention.

FIG. 7 is an example of screen for illustrating the message service function according to a second embodiment of the present invention.

Referring to FIG. 7, the portable device display unit of the present invention can output a main menu to the display unit so that user may select a basic function of portable device as shown in screen 205. Then, in case a QWERTY key input signal is generated, the controller can output a mini text writing window for outputting a QWERTY key input signal inputted as shown in screen 206 and a character which is may be inputted. In the meantime, in case additional texts are generated as shown in screen 207 as more text inputs are generated from the QWERTY keypad, the controller can expand the size of the mini text writing window. That is, as shown, in case a character corresponding to "This is my picture. Doesn't look so fun." is inputted from the QWERTY keypad, and the display unit cannot display the inputted character with a single line, the controller can divide the written text into two lines as shown in screen 207. Moreover, if additional text input is generated, the controller can display the additional text inputted (i.e., "I hope you like it") in a third line as shown in screen 208. In this process, the controller can control the output of characters or sentences which are inputted to a most lower portion of the message writing area, whereas the oldest sentences are progressive displayed to in an upper portion of the message writing area.

Figure 8:
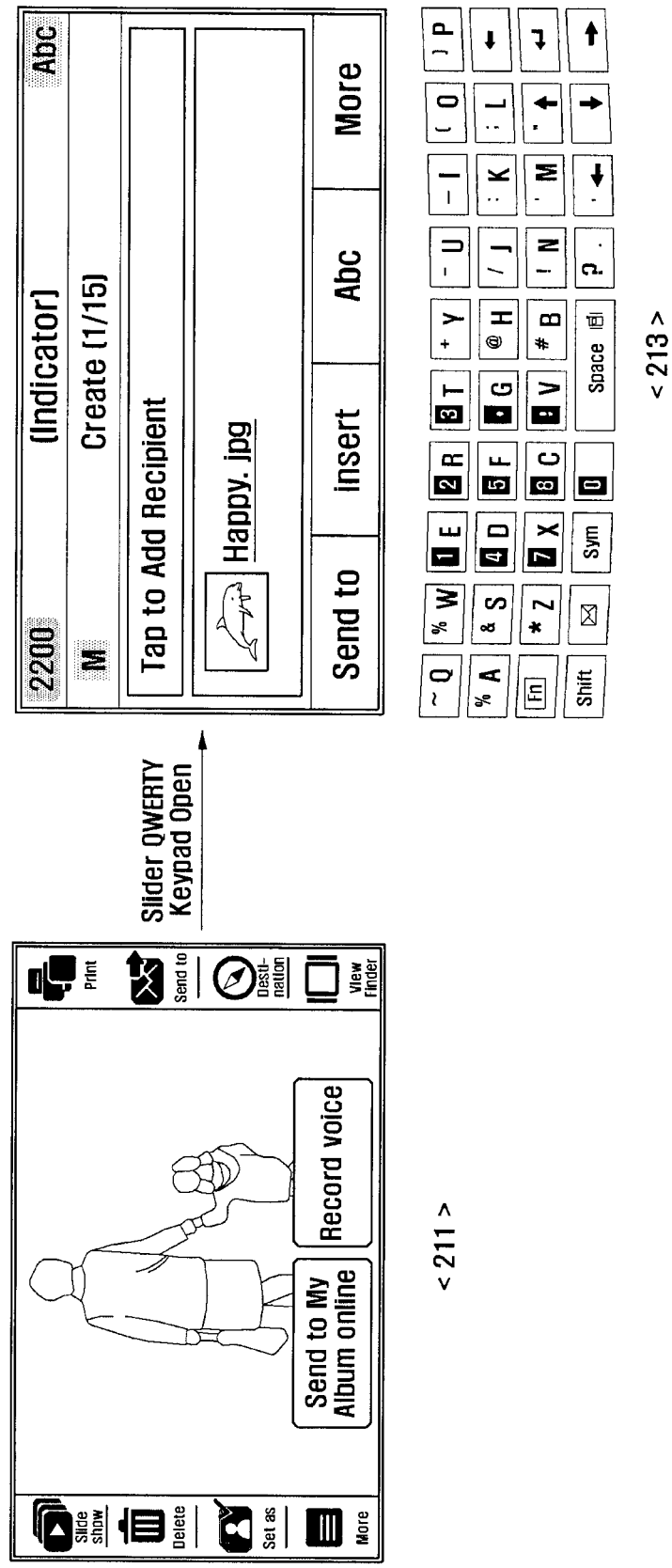
FIG. 8 illustrates an example of a screen for illustrating a message service function according to a third embodiment of the present invention.

FIG. 8 is an example of screen for illustrating the message service function according to a third embodiment of the present invention.

Referring to FIG. 8, the portable device of the present invention can activate a camera application and can output a corresponding image as shown in screen 211 according to a user's input. Accordingly, the portable device outputs image of a subject inputted through camera to the center of screen while outputting a menu for controlling the camera operation to both sides of the screen. Additionally, in case the camera performs photographing to collect still image or moving picture, the portable device can output the still image or the moving picture to the display unit.

The portable device can output a short key for the support of a service that can be executed based on a corresponding image. For example, a short key for selecting a "Send to My Album online" service through which a corresponding image can be uploaded on-line may be displayed. And furthermore, a short key for selecting a "Record Voice" service, which supports recording a sound with a corresponding image may be displayed. User can then directly move to a corresponding service by activating one of the short keys.

In addition, the portable device user may generate a QWERTY key input signal by using a QWERTY key pad when the photographed image is outputted to display unit. The controller may then activate a message application. Accordingly, the controller outputs a message write window according to the activation of message application to be adjusted to an application program being activated, (i.e., a camera search application program). That is, the message write area can be generated in an area of a center part of the display unit, for example. At this time, the controller can control the image photographed by camera to be attached to a message as an attachment file. The controller can control the output of a corresponding icon to one side of the message write window so as to indicate the attachment of the image. The portable device user can additionally generate a QWERTY key input signal for inputting additional text.

When receiving a character input from the QWERTY key pad, the controller can output the received character input in the write window. As described, in case a QWERTY key input signal is generated in the state where a camera is activated and an image is photographed, the portable device can control the output message write window, which can transmit a message based on the photographed image.

Figure 9:
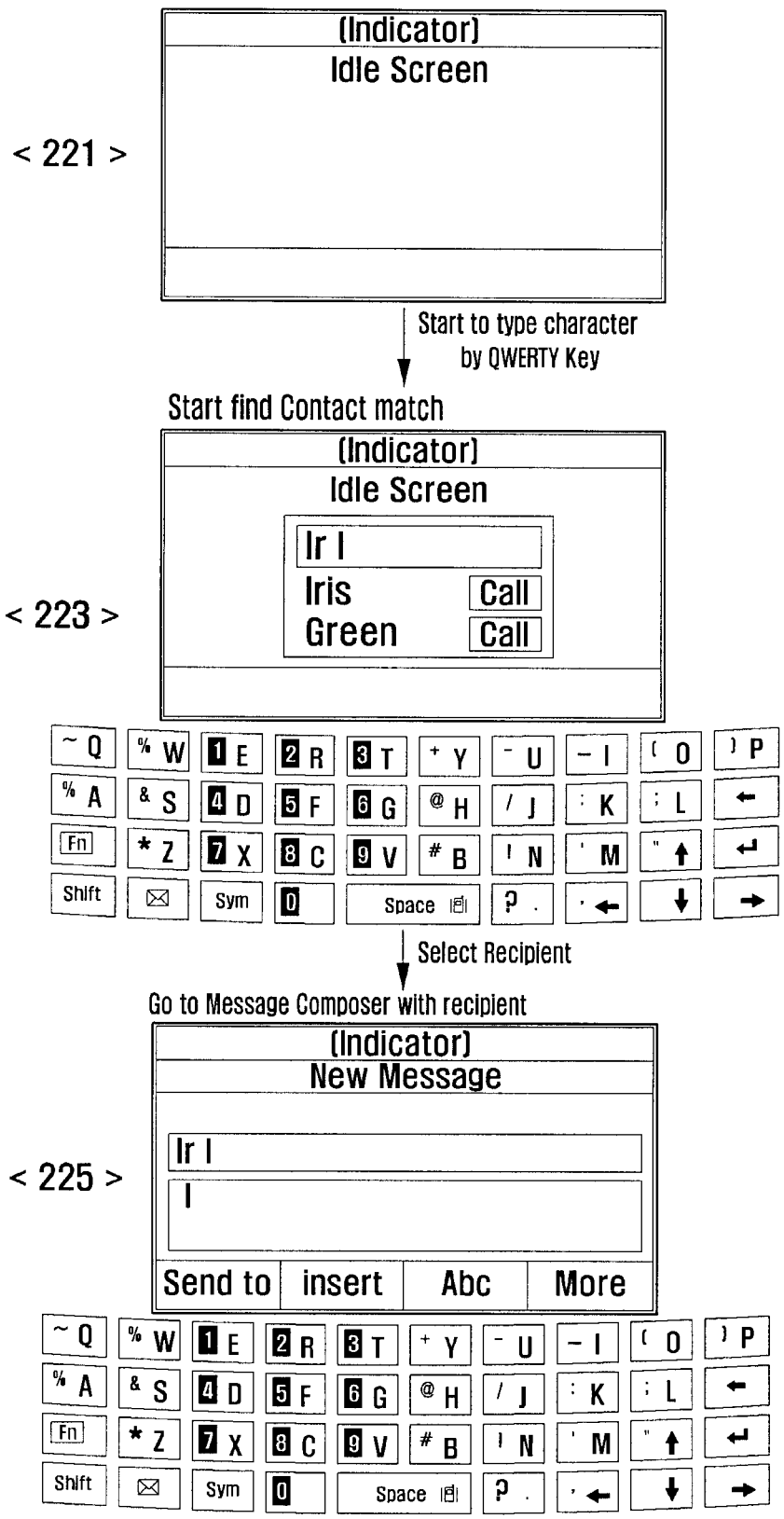
FIG. 9 illustrates an example of a screen for illustrating a message service function according to a fourth embodiment of the present invention.

FIG. 9 is an example of screen for illustrating the message service function according to a fourth embodiment of the present invention.

Referring to FIG. 9, the portable device of the present invention can output a preset standby screen as shown in screen 221, when power is supplied and booting is completed. The outputted standby screen can be an image or moving picture set by user. When the user generates a QWERTY key input signal, the controller activates a message application as shown in screen 223. The controller can then search a phonebook based on the character inputted from QWERTY key pad and present phonebook information having an identical character.

The controller can output at least one phone book information including a corresponding character through a separate pop-up window. For example, phonebook information that has the term "Iris" as a name exists, the controller can detect "Iris" that includes the letters "Ir" when the letters "I", and "R" are inputted from QWERTY key pad. Then, the controller can output a pop-up window which can select "Iris". At this time, the controller can simultaneously output the term "Green," which is registered in phonebook information after the term "Iris" to the pop-up window. In the meantime, in case a touch event or QWERTY keypad input for selecting the term "Iris" is generated in screen 223, the controller can output a message write window for writing a message to be transmitted to "Iris" as shown in screen 225. In the generated message write window, the recipient's name corresponding to "Iris" selected in screen 223 can be outputted to a separate area. The portable device user can input a character by using a QWERTY key pad, the controller can control the output of the inputted characters corresponding to the inputted key value to message write window.

Figure 10:
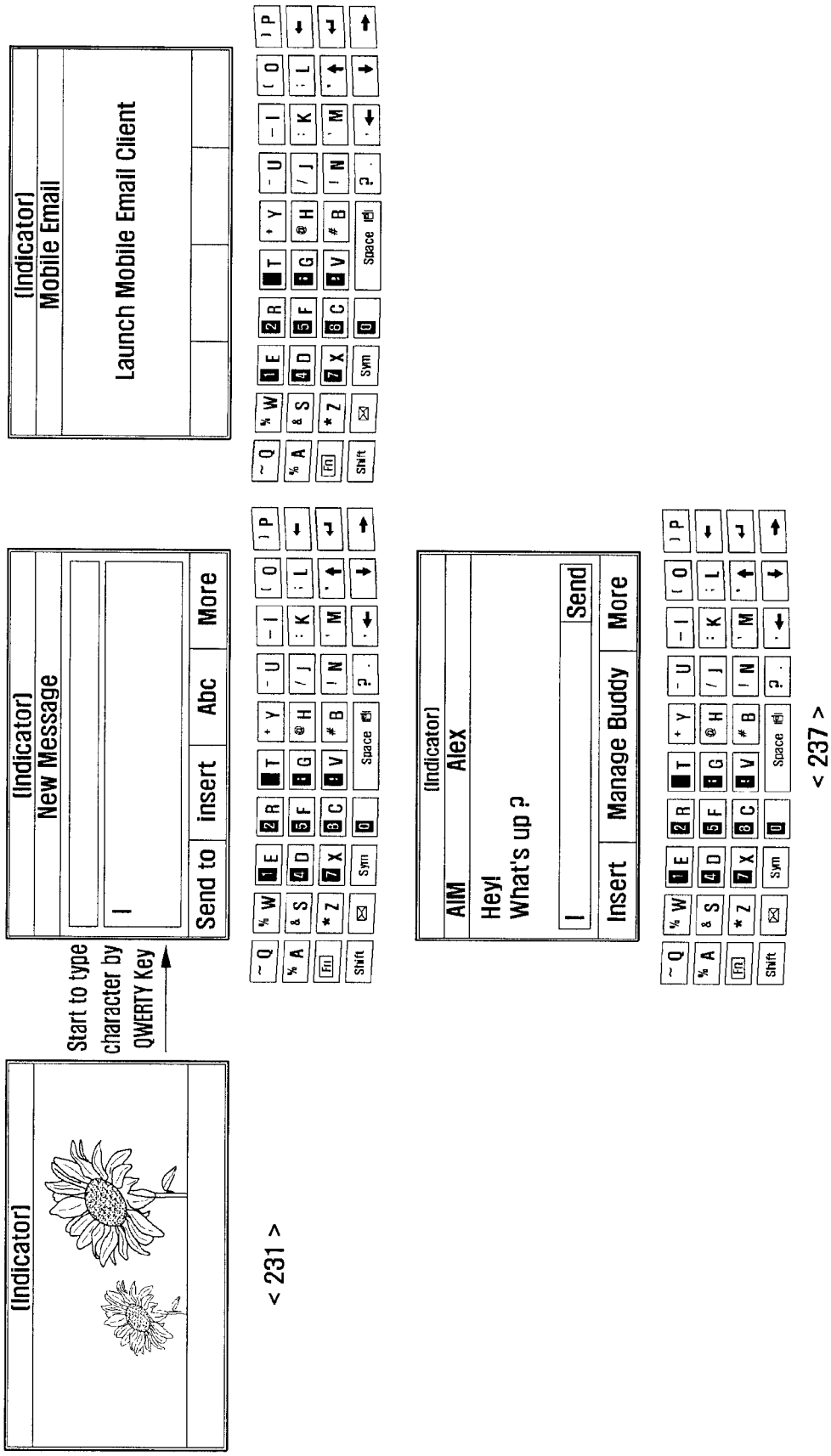
FIG. 10 illustrates an example of a screen for illustrating a message service function according to a fifth embodiment of the present invention.

FIG. 10 is an example of screen for illustrating the message service function according to a fifth embodiment of the present invention.

Referring to FIG. 10, the portable device can output a preset standby screen as shown in screen 231, when power is supplied and booting is completed. At this time, the outputted standby screen can be an image or moving picture set by the user, and can be a default screen when a pre-set image does not exist. In case user generates a QWERTY key input signal in the state where standby screen is outputted, the controller activates a message application as shown in screen 233. The controller can output a message write window according to the activation of message application. The message write window supporting the message service can include an index value, such as "New Message," which indicates new message writing, and an area where a telephone number of at least one other portable device of a person who will receive the message or a corresponding name is written, and an area where a text is inputted from QWERTY key pad.

To this end, portable device user should perform a prework for setting to use message service function in case QWERTY key input signal is generated. It is preferable that the controller provides menu or environment setting which can designate the characteristic of the kind of application which is to be performed in response to the generation of QWERTY key input signal so as to support the above setting. In case the portable device supports the menu or environment setting mode, a user can perform the setting of an application to be performed in response to the generation of a QWERTY key input signal in a corresponding mode.

In the meantime, when user generates a QWERTY key input signal, in case an application program for the transmission of e-mail is set to be executed, the portable device can control the generation of an e-mail write window. The e-mail write window can include an index value. Such as "Mobile Email," in a display area which informs the user that an e-mail is to be written, and a write window area for writing an e-mail. In the meantime, the portable device can access a server for writing an e-mail. In this process the portable device can output a text "Launch Mobile Email Client" which indicates that an e-mail client application is being launched.

In addition, in case a user generates a QWERTY key input signal, when an application program for the transmission of "instant" message is set to be automatically executed, the portable device can generate an instant message write window. The instant message write window can include an area which outputs at least one name of a person who may transmit and receive a message, and an output area which outputs an instant message transmitted and received with the person having a corresponding name, and a write window area in which an instant message to be transmitted may be written.

For example, "AIM" and "Alex" that transmitted and received an instant message can be outputted respectively to an area which outputs a name. When "AIM" is selected among them, the message "Hey!", "What's up?" that transmitted and received with "Alex" can be outputted to an output area.

Here, "Hey!" can be an instant message that has been transmitted to "AIM", and "What's up?" can be an instant message that has been received from "AIM". A user can write a message to be transmitted to "AIM" in the write window area. After writing the message, in case a touch event is generated in a "send" area or an Enter key of a QWERTY key pad corresponding to confirmation is inputted, the portable device controller can transmit the message written in the write window area to "AIM". When "Alex" is selected in an area where names are outputted, the portable device displays a write window for transmitting an instant message to "Alex" and an output area for writing an instant message that is to transmitted to Alex.

In the process of using instant message service, when one of the names presented in the name area is deleted, or when a message is additionally to be transmitted and received with another user, user can clean up the name area by using a "Manage Buddy" short key, or can search for other persons by searching phonebook information. The portable device can contain a "More" key so as to support other menus.

Figure 11:
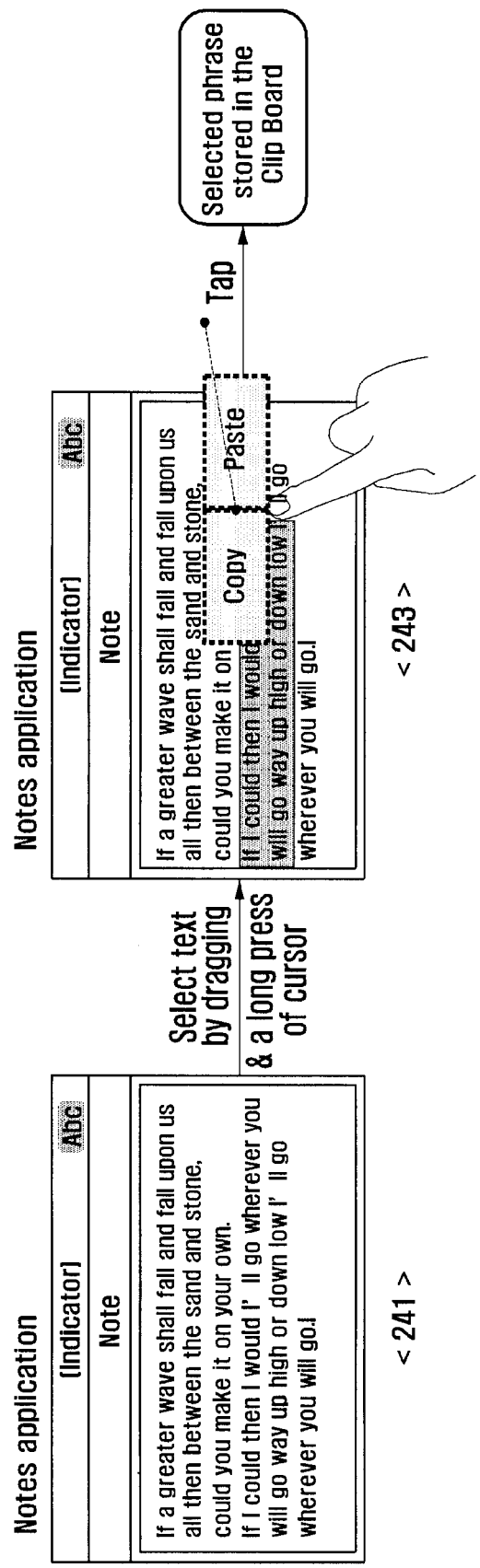
FIG. 11 illustrates an example of a screen for illustrating a message service function according to a sixth embodiment of the present invention.

FIG. 11 is an example of screen for illustrating the message service function according to a sixth embodiment of the present invention.

Referring to FIG. 11, the portable device of the present invention can activate a "Note" application program that is a text edit tool according to a user's selection. Accordingly, the portable device can control a text edit tool according to the activation of the "Note" application program, and can=output a specific note or note file stored in the storage unit according to an input of the user to the text edit tool as shown in screen 241.

Next, the portable device can control selection of a corresponding text as shown in screen 243, when a user performs a dragging operation of an area of text to select a part of the text, or press a specific point for a long time. In more detail, the portable device can control selection of a text indicated in an area where a touch event is generated while dragging occurs. Moreover, the portable device can automatically select one sentence or paragraph including a specific point, in case of pressing a specific point for a long time. And, as shown, the portable device can control the generation of a pop-up window that inquires whether the selected text is copied around the selected area.

When a user selects copy item in the corresponding pop-up window, the portable device temporarily stores the selected text. In this process, when a QWERTY key input signal is received, the portable device can output the pop-up window. That is, a user generates a QWERTY key input signal after selecting a specific text area, the portable device can output a pop-up window that can select the copy to the neighborhood of the selected area. In addition, the controller can add an item for pasting to pop-up window In case the previously selected text exists, and user selects a paste operation, the selected area can be replaced with a previously selected text. In case an additionally stored text does not exist, when a user selects the paste operation, the controller shows up pop-up window informing the user that stored text does not exist. An output alarm sound or a vibration alarm may also be outputted. The stored text can be stored in clip board which is separately prepared.

Figure 12:
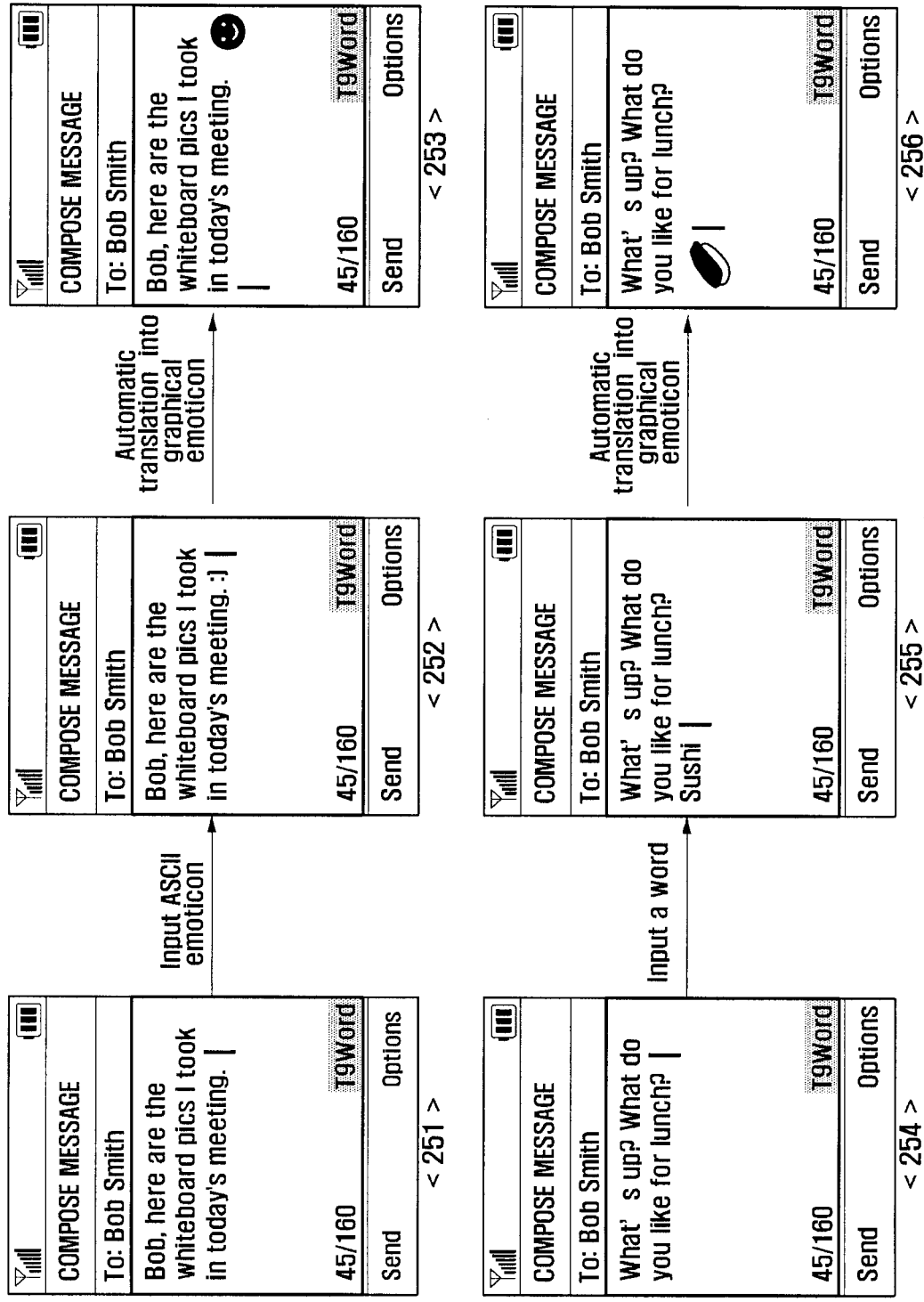
FIG. 12 illustrates an example of a screen for illustrating a message service function according to a seventh embodiment of the present invention.

FIG. 12 is an example of a screen for illustrating the message service function according to a seventh embodiment of the present invention.

Referring to FIG. 12, the portable device of the present invention can output a graphic emoticon among message service functions in place of special characters. To this end, the portable device activates application program for supporting a message service function in case a QWERTY key input signal is generated. The portable device can output characters inputted from the QWERTY key pad to a message write window as shown in screen 251. At this time, in case special character ":)" is inputted from QWERTY key pad like screen 252, the portable device checks whether a graphic emotion mapped to the special characters is stored. To this end, the portable device can store a table that maps the special characters to graphic emoticons in the storage unit. In case of detecting graphic emoticon mapped to the special character, the portable device can output a corresponding graphic emoticon "☻" as shown in screen 253.

The portable device can support a graphic emoticon substitution function for a specific word. For example, in case the word "Sushi" is inputted as shown in screen 255 in a state where normal characters are inputted as shown in screen 254, the portable device can check whether a graphic emoticon corresponding to the term "Sushi" exists. To this end, the portable device can store a table that maps specific words to graphic emoticons in the storage unit. In case of detecting graphic emoticon mapped to the specific word from the storage unit, the portable device can output a corresponding graphic emoticon as shown in screen 256.

Figure 13:
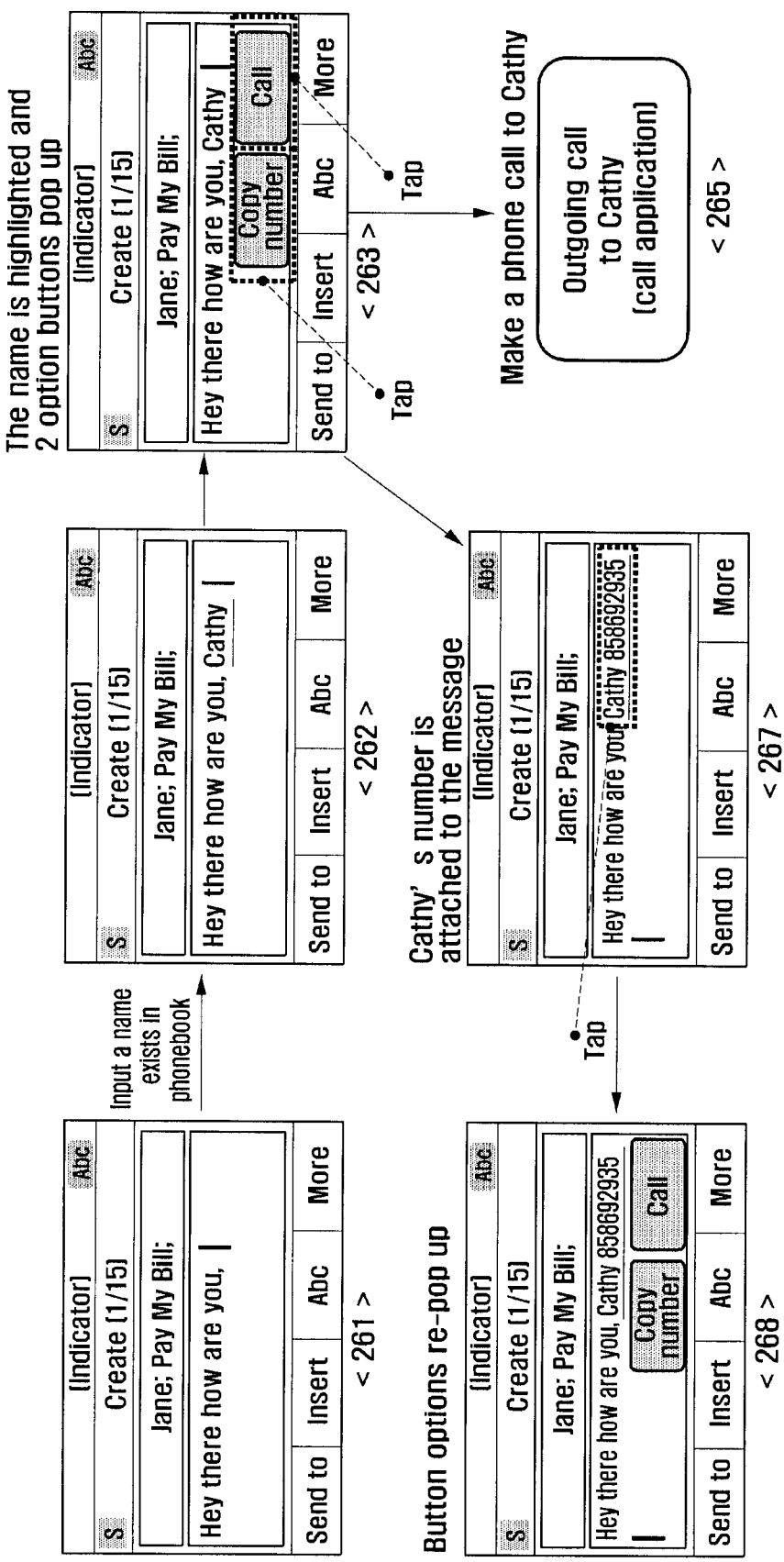
FIG. 13 illustrates an example of a screen for illustrating a message service function according to an eighth embodiment of the present invention.

FIG. 13 is an example of a screen for illustrating the message service function according to an eighth embodiment of the present invention.

Referring to FIG. 13, the portable device of the present invention can output a message write window as shown in screen 261 according to the activation of message service function. The message write window includes an area to which a name of a person who is to receive a message is inputted and an area where a message is to be written. A telephone number can be inputted to the area the message recipient name is to be outputted. However, in case of telephone number is previously stored in phonebook, the name corresponding to a inputted telephone number, for example, "Jane; Pay My Bill" can be displayed. The character "Hey there how are you" corresponding to the input from a QWERTY key pad can be outputted to the area where a message is to be written.

In the meantime, the inputted word "Cathy" is previously stored in phonebook as shown in screen 262, the portable device can display a corresponding word differently with other words. To this end, the portable device can search whether a name mapped to a corresponding word is stored, when characters inputted to a message write window forms a specific word. In case of searched word, a corresponding word is underline by the portable device, or a corresponding word is displayed to be larger or bolder than other words so that it can be indicated that other information is included. The portable device can output a pop-up window which can select other information included in a corresponding word, as shown in screen 263, in case a cursor stays in the word "Cathy" for a predefined time.

For example, the pop-up window can include a phone number copy button (Copy number) which supports a copy operation of the telephone number into a phonebook included in the word, and a call button (Call) which supports to call operation based on the telephone number included in the word. In case the portable device user selects the call button (Call) on screen 263, the portable device can attempt to call the phone number included in the word as shown in screen 265. The portable device can output a screen corresponding to a call to the display unit so as to perform a call with "Cathy". At this time, it is preferable that the portable device temporarily stores the written message write window. The portable device can output the temporarily stored message write window to the display unit.

In the meantime, in case a user generates touch event which selects a phone number copy button (Copy number) as shown in screen 263, the portable device can output the phone number included in the term "Cathy" to the message write area as shown in screen 267. At this time, the portable device can display a phone number as well as the inputted word "Cathy" to be distinguished from other words. That is, the portable device can support an effect, such as underlining, applied to the term "Cathy", to the copied phone number. In case a cursor is positioned on a corresponding phone number, after phone number is outputted to message write area, the portable device can output a pop-up window including the phone number copy button and the call button as shown in screen 268.

Figure 14:
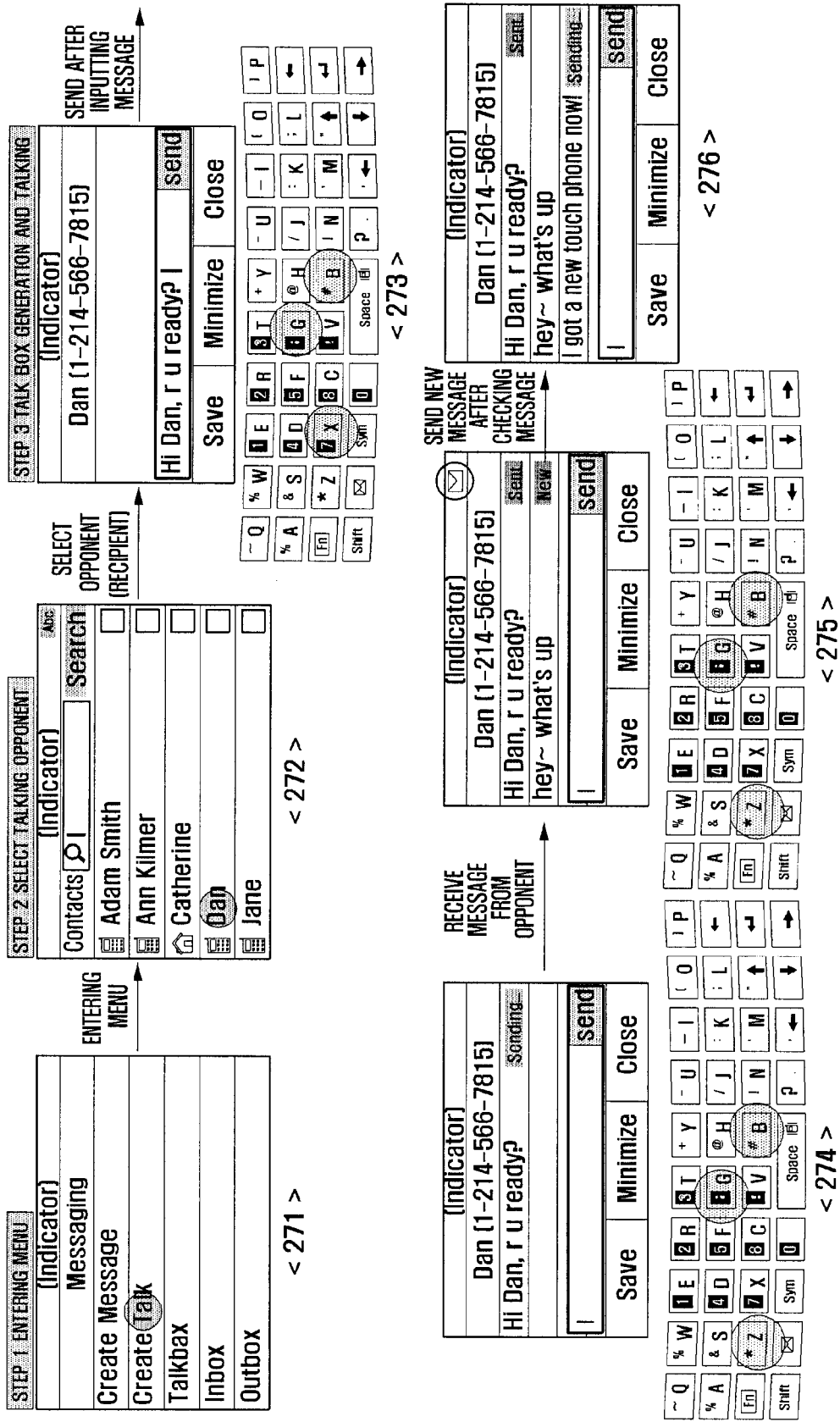
FIG. 14 illustrates an example of a screen for illustrating a message service function according to a ninth embodiment of the present invention.

FIG. 14 is an example of a screen for illustrating the message service function according to a ninth embodiment of the present invention.

Referring to FIG. 14, the portable device of the present invention can include a category-like screen as shown in screen 271 so as to conveniently select a menu for the usage of a message service. That is, the message service category of the present invention can include "Create message", "Create Talk", "Talk box", "Inbox" and "Outbox". The "Create message" is an item for opening a new message write window for writing a message, and the "Create Talk" is an item for opening an instant message write window for transmitting and receiving an instant message. The "Talk box" is a box for storing data generated according to the transmission and reception of an instant message, and the "Inbox" and "Outbox" are boxes for storing the transmitted and received messages from among short or multimedia messages transmitted and received based on the message write window.

In case a user selects the "Create Talk" category, as an example, from among a plurality of categories as shown on screen 271, the portable device can output a search window that can search for a plurality of users who can transmit and receive instant message as shown in screen 272.

This search window includes a search area for inputting a word and an area which outputs data corresponding to a word inputted to the search area. In case an additional search word is not inputted, the area which outputs data can output lists of multiple entries that match the inputted work and can transmit and receive instant message in a predefined order, e.g., in alphabetical order. In case a touch event that selects one of the entries on the list (e.g., "Dan" as shown in screen 272) a corresponding signal is generated. The portable device can output an instant message write window so as to transmit and receive instant messages with "Dan" as shown in screen 273. The instant message write window can include an area which outputs a selected name and the term "Dan (1-214-566-7815)," which is a telephone number information corresponding to the selected name, an input window for inputting message, and a short key area which can select other menu.

Instead of generating a touch event selecting "Dan" as shown in screen 272, in case a slide is opened in a portable device of a slide type, and a QWERTY key input signal that designates "Dan" is generated, the portable device can output the instant message write window as shown in screen 273. The portable device user can input characters by using the QWERTY key pad as shown in screen 273, and can output the inputted character "Hi Dan, r u ready?" to the input window. In case a user activates the "Send" key as shown in screen 273, the portable device can transmit the inputted instant message to "Dan" at the indicated telephone number, while being able to control the transmission and reception message output window as shown in screen 274.

The transmission message output window can include an area where the message inputted to the input window is written and an area which outputs the term "sent" indicating that the transmission of a corresponding message is completed or "sending" indicating that the corresponding message is being transmitted. Next, when receiving instant message from "Dan", the portable device controls the output of the received message to transmission and reception message output window as shown in screen 275. The portable device can output an icon informing the user that the instant message has been received and sent to the indicator area.

In the meantime, the portable device can position the received instant message next to the transmitted instant message, during the process of outputting the received instant message to the transmission and reception message output window, and to output an index which informs the user that a corresponding instant message is newly received, e.g., "New", on the same line with "hey~ what's up" which is a corresponding instant message. The portable device user can write a new message "I got a new touch phone now!" as shown in screen 276 and can send this new message to "Dan", after checking message received from "Dan".

At this time, it is preferable that the portable device supports a function that easily determines the progress of conversation in such a manner that the written instant message is outputted to the transmission and reception message output window while the written instant message is set to be positioned next to the reception message. In case a new instant message is written to be transmitted, the index "New" marked in the previously received message can be deleted.

Figure 15:
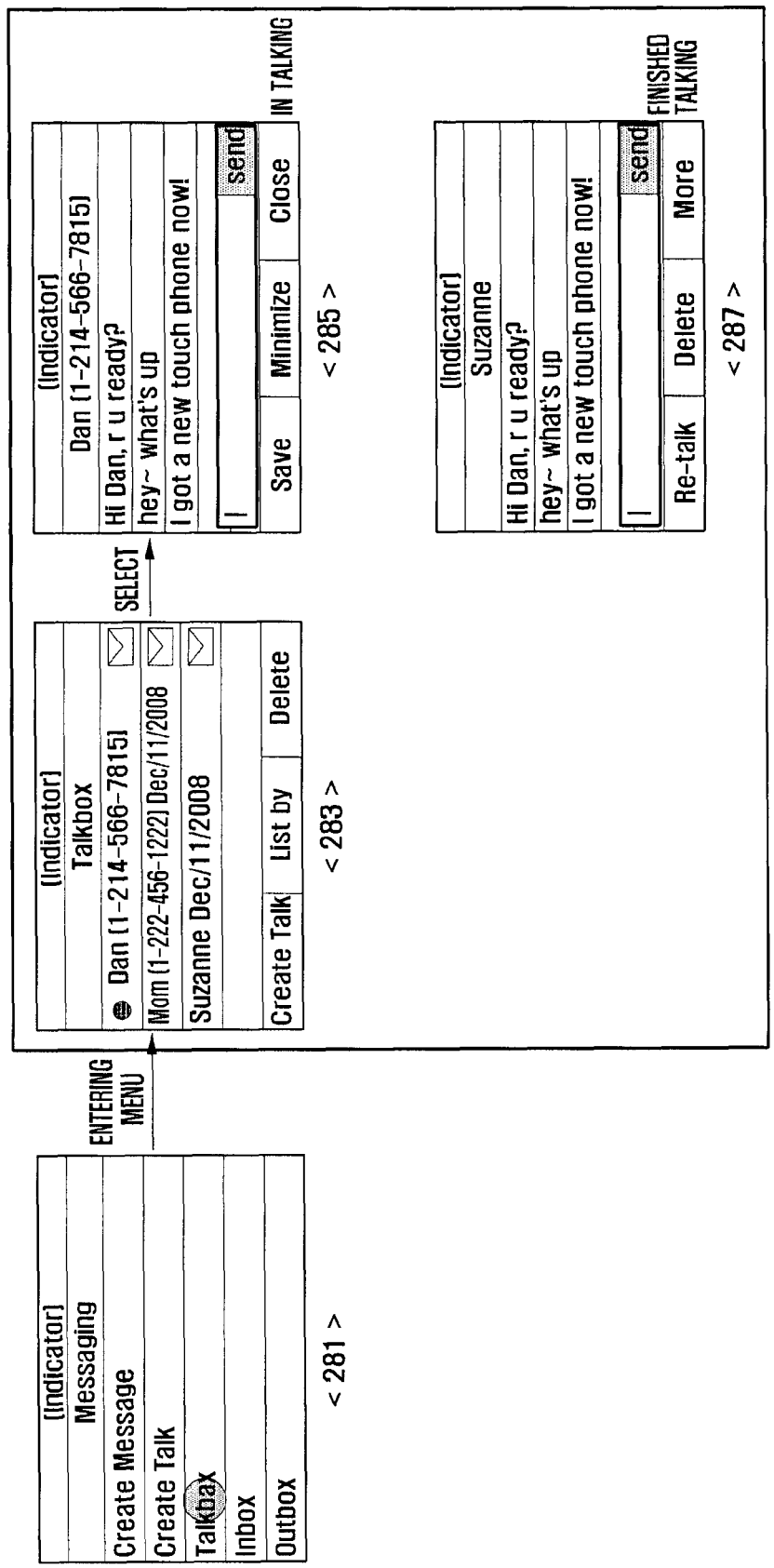
FIG. 15 illustrates an example of a screen for illustrating a message service function according to a tenth embodiment of the present invention.

FIG. 15 is an example of screens for illustrating the message service function according to a tenth embodiment of the present invention.

Referring to FIG. 15, the portable device of the present invention can include a category-like screen as shown in screen 271 so as to conveniently select a menu for the usage of a message service. Screen 271 is set by a user or may be set as a default mode in such a manner that screen 271 is outputted when user generates a QWERTY key input signal in the state where a specific application program (e.g., standby) is activated. The message service category can include "Create message", "Create Talk", "Talk box", "Inbox" and "Outbox". In case user selects "Talk box" category among a plurality of categories from screen 281, the portable device can output screen including "Talk box" submenu as shown in screen 283.

Submenu screen can include an area which outputs index "Talk box" that indicates the menu displayed by a current screen, and an area which lists an indication that the instant message has been transmitted and received by name. Here, the portable device can control the item that transmits and receives a current instant message to be displayed in such a manner that an index is positioned in front of a corresponding list so as to be differentiated with other items.

In screen 283, if the portable device user generates a touch event that selects a specific user to which a current instant message is transmitted and received, e.g., "Dan", the portable device can output an instant message screen which is being processed. The processed can be determined based on the maintenance or cancellation of a communication channel for the transmission and reception of the instant message. In the instant message screen which is being processed, other menu items including items for the support of instant messages, i.e. includes "Save, Minimize, Close" may be presented In the meantime, if the item that completed the process is selected as shown in screen 283, the portable device outputs instant messages transmitted and received with a person according to a corresponding item like screen as shown in screen 287. The portable device can include other menu items, such as "Re-talk, Delete, More" or the like for deleting and reconnecting the instant message.

Figure 16:
FIG. 16 illustrates an example of a screen for illustrating an additional function of FIG. 15.

FIG. 16 is an example of screens for illustrating another example of submenu screen for "Talk box" of FIG. 15.

Referring to FIG. 16, as shown in screen 291, the submenu screen of "Talk box" includes an area which outputs index "Talk box" indicating the display of the current screen, and an area which outputs a list of persons who are transmitting and receiving instant messages with portable device user, or the list of persons who transmitted and received instant messages. The list output area can output a photo file of users who transmitted and received instant message to the left side of corresponding list, and can output the name of users and the telephone number of users. The list output area can display a user who is transmitting and receiving instant message to be different from other users, e.g., to be displayed with a bold type.

Further, as shown in screen 293, the submenu screen of "Talk box" can include an area which outputs "Talk box" directing a current screen, and an icon output area which matches respective users who is transmitting and receiving instant message or transmitted and received instant message to a certain image. Each icon can include an image which signifies instant message service, and the name of a person in the icon output area. At this time, the portable device can output a part of a name when the length of the name is longer than the length of the icon. The portable device can control the screen image such that the person who is transmitting and receiving instant message to have an image that is distinguishable from other images. That is, in case "Dan" is a person who is transmitting and receiving instant messages, the portable device can output the icon of "Dan" with an image which is distinguishable from others persons, e.g., with an image that the cover of letter is opened The portable device can set the size of the icons depending on the time of transmitting and receiving instant messages, and the amount (time, data bytes) of transmitted and received data. That is, the portable device can display the icon of a person who transmitted and received instant messages, a person who transmitted and received many instant messages, and a person who transmitted and received instant messages having large data, such as photo attachment, to be larger than an icon that represents other people.

Figure 17:
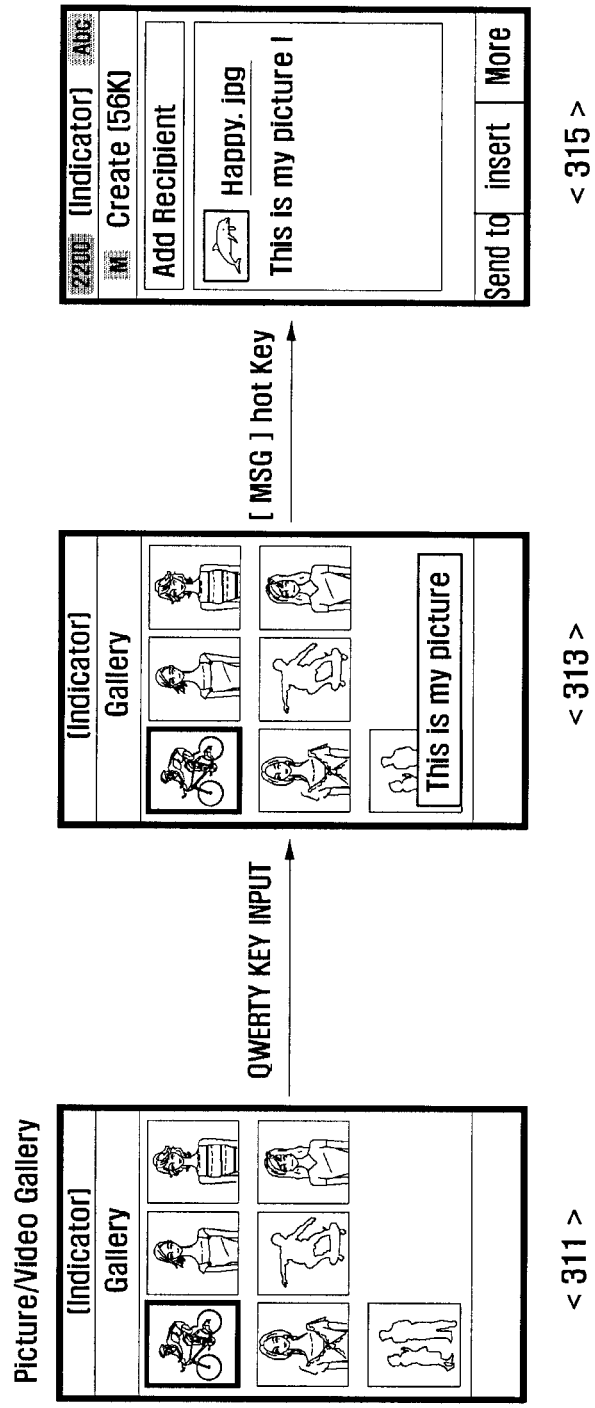
FIG. 17 illustrates an example of a screen for illustrating a message service function according to an eleventh embodiment of the present invention.

FIG. 17 is an example of screens for illustrating a message service function according to an eleventh embodiment of the present invention.

Referring to FIG. 17, the portable device of the present invention can output various image files in the form of multi-view like screens as shown in screen 311 according to the request of the activation of an image file search function by user. The image file outputted on the screen 311 can be a photo, a picture or a video file. Meanwhile, a user can designate a specific image in the multi-view screen file by inputting a direction key of the input unit or generating a touch event on a touch screen. In this state, in case a user generates a QWERTY key input signal, the portable device can output a simple message write window like screen as shown in screen 313. The portable device can output the text "This is my picture" which is inputted according to the input of the QWERTY keypad to the simple message write window.

In the screen 313, in case a hot key for the activation of a user message service "[MSG] hot key" is activated, the portable device can output a message write window for writing a message like screen as shown in screen 315. At this time, the portable device can note the image file designated in the screen 313 as an attachment file, and can output this to a certain area of a message write window.

As described above, the portable device of the present invention supports the easy generation of a message write window when searching a plurality of image files with a multi-view type, and to be able to write a message based on image file designated in the multi-view screen.

Figure 18:
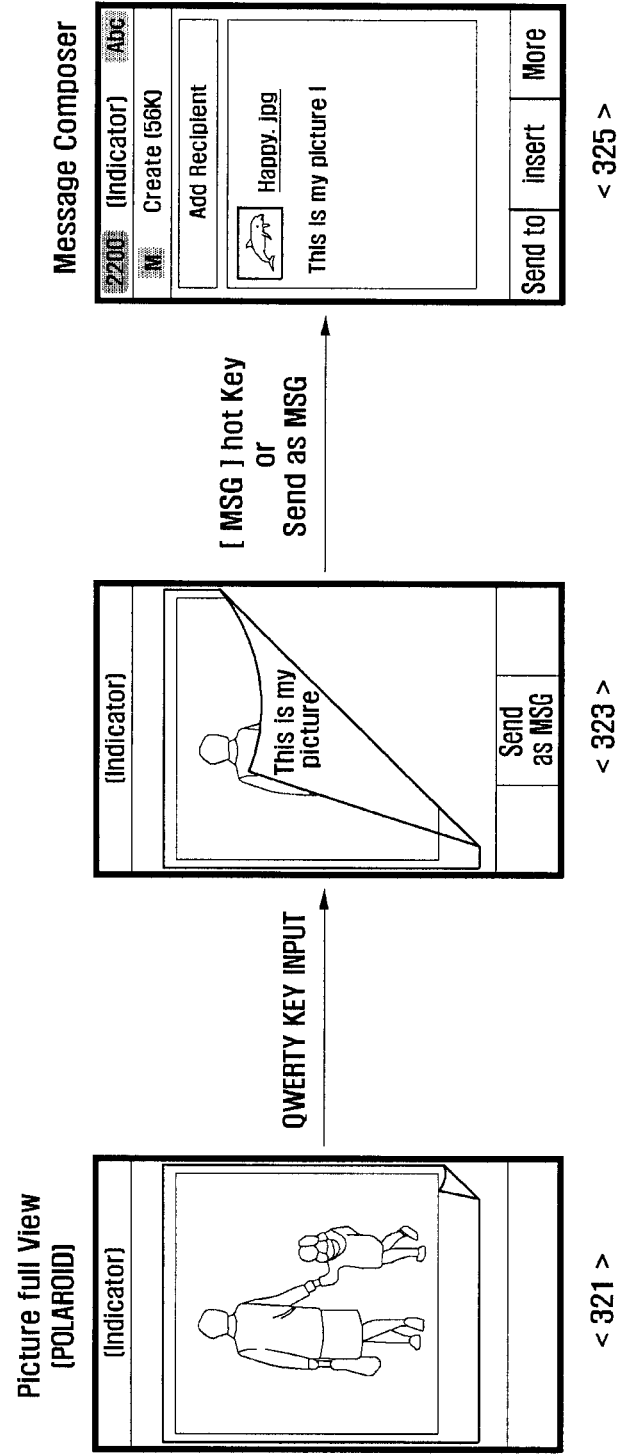
FIG. 18 illustrates an example of a screen for illustrating a message service function according to a twelfth embodiment of the present invention.

FIG. 18 is an example of screens for illustrating the message service function according to a twelfth embodiment of the present invention.

Referring to FIG. 18, as shown in screen 321, the portable device of the present invention can output a photograph with full screen according to the activation of an image capture function using a photograph search function. At this time, by using an image capture function, the portable device can apply a certain display, e.g., an image corresponding to folding to a certain area of photograph so that user can select and check the rear side of photograph (see screen 323). In the meantime, the portable device can apply a corresponding text to a photograph to be transmitted and output, in case a user inputs text by using a QWERTY key pad. In more detail, user can select a folding image set in the edge of photograph outputted to the display unit, and, accordingly, can see the rear side of photograph.

To this end, in case a user drags a part of an image in a certain direction, e.g., in an oblique direction of upper portion, in the state of pressing the folding image, the portable device can output a certain area of rear side of the photograph. Thereafter, a user inputs character based on the QWERTY key pad, the portable device can provide an effect that the inputted text "This is my picture" is written on the rear side of the photograph. Then, the portable device can activate a message write window as shown in screen 325, when a hot key for the activation of a message service. "[MSG] Hot key," or a message transmission button "Send as MSG" is selected.

At this time, the portable device can apply the photograph which is being outputted as shown in screen 323 as an attachment file. Further, the portable device can automatically input the text "This is my picture" written in the rear side of the photograph as shown in screen 323, into the text write window.

Figure 19:
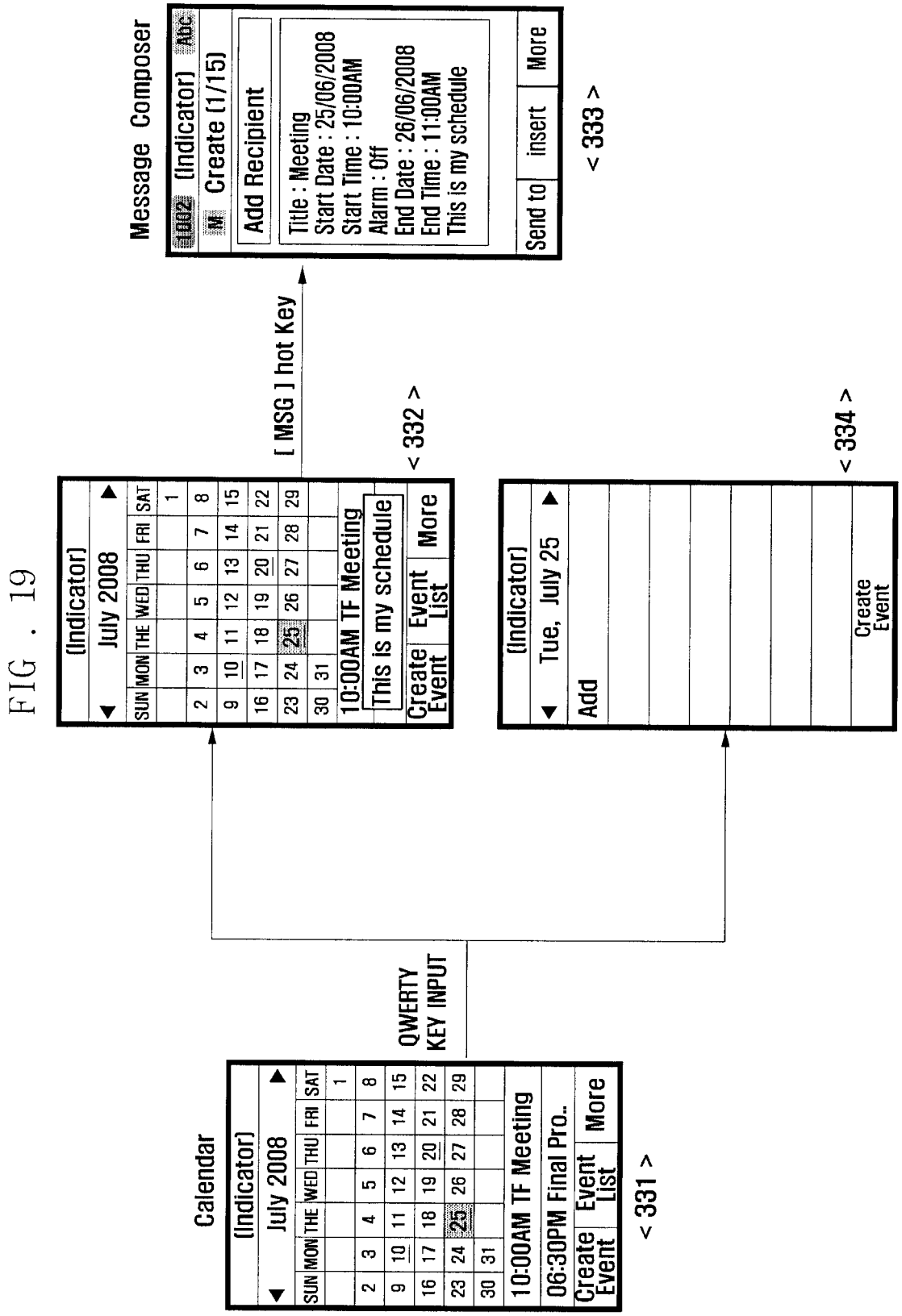
FIG. 19 illustrates an example of a screen for illustrating a message service function according to a thirteenth embodiment of the present invention.

FIG. 19 is an example of screens for illustrating the message service function according to a thirteenth embodiment of the present invention.

Referring to FIG. 19, the portable device of the present invention can activate a schedule application program according to the user's input. Thus, the portable device can output a scheduler screen including a calendar corresponding to a specific month as shown in screen 331. At this time, when a specific date is designated in the calendar, the portable device can output a schedule that is previously stored in a corresponding date to a certain area of a lower portion of the calendar. In the state where such a scheduler screen is outputted, when a user generates a QWERTY key pad input signal by using a corresponding QWERTY key pad, the portable device can output a simple write window in which text can be inputted in a certain area of the display unit as shown in screen 332. In addition, the portable device can output the combination of characters "This is my schedule" inputted from a QWERTY key pad to the simple write window. Here, the portable device can output the simple write window to the upper portion of an area where the schedule is outputted.

In case a user depresses the "[MSG] hot key," which is a hot key for the activation of a message as shown in screen 332, the portable device can control the schedule to include a designated date automatically in the message writing. Further, the portable device can directly apply the sentence inputted in the screen 332 to the message write window. In the meantime, when the QWERTY key input signal is generated in the screen 331, in case a separate schedule is not stored for the designated date, the portable device can output a schedule input window for the input of schedule information. In summary, the portable device of the present invention can open a writing window for inputting additional sentences (and terms), in case QWERTY key input signal is generated in the state where a scheduled date is designated. The controller can also output both schedule information included in the corresponding date and a text information inputted in the write window to a message write window in case a key input for a message transmission is generated. Further, the portable device can present an input window for inputting schedule information in case a QWERTY key input signal is generated in the state where no schedule is prepared at a designated date, FIG. 20 is an example of screens for illustrating the message service function according to a fourteenth embodiment of the present invention.

Figure 20:
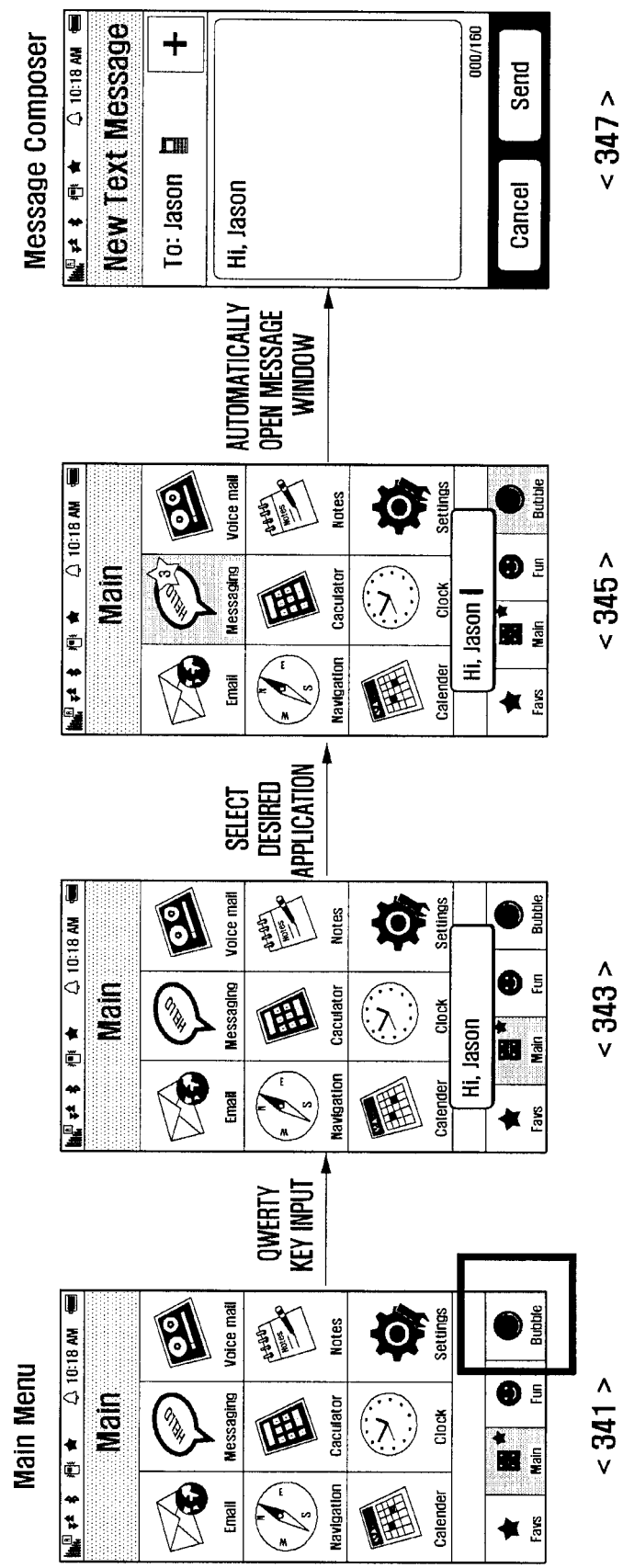
FIG. 20 illustrates an example of a screen for illustrating a message service function according to a fourteenth embodiment of the present invention.

Referring to FIG. 20, the portable device of the present invention can output a main menu screen as shown in screen 341 according to a user's input. At this time, the portable device can provide a short key which can turn the "Bubble" function on and off. In case the "Bubble" function is turned off, the portable device can display a corresponding short key with gray color or the like to inform the user that the function is turned off. In the meantime, in case a QWERTY key input signal is generated in the state where the short key of the bubble function is turned on, the portable device can output a bubble window corresponding to the bubble function short key to one side of screen as shown in screen 343.

At this time, the portable device can manage a main menu screen and bubble window which are being activated as respective layers on the display. Accordingly, when a character is inputted from a QWERTY key pad, the portable device can display the inputted character to the bubble window, while displaying an activate menu function which is matched to a corresponding area where a touch event may be generated in one side of the display unit.

In the meantime, after text "Hi, Jason" is inputted from a QWERTY key pad, in case a user generates a touch event selecting a specific menu among main menu, e.g., "Messaging" menu corresponding to message service function as shown in screen 345, the portable device can output a screen which activates a selected menu as shown in screen 347. At this time, the portable device can provide an effect that the bubble window which is being activated moves to a corresponding menu according to the menu selection as shown in 345. Through this effect, text written in the bubble window is applied to a corresponding menu.

As a result, the portable device can automatically output text inputted in the bubble window to the activated message write window as shown in screen 347.

As described above, the portable device according to exemplary embodiments of the present invention can provide an adaptive screen interface according to an application program which is being activated or an application program selected by a user in the generation of a QWERTY key input signal.

In the description of above described embodiments, QWERTY key input signal can be generated, in case the portable device is a slide type having an input unit that is exposed as it slides open, or in case a key of QWERTY key pad prepared in the input unit is activated. Additionally, QWERTY key input signal can be generated, in case QWERTY key map is outputted to a display unit and a touch event is generated on a corresponding key map, as portable device of a slide type performs sliding operation or icons assigned to activate QWERTY key map is activated.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. As would be recognized by those skilled in the art, when a general purpose computer is loaded with, or accesses, software or code for implementing the processing shown herein, the general purpose computer is transformed into a special purpose computer that may at least perform the processing shown herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A portable device that provides a message service function, the portable device comprising:
   an input unit which includes at least one of a keypad that generates a key input signal, and a key map that generates a key input signal according to a touch event;
   a controller configured to:
   display, on a display unit, of at least one picture,
   detect a key input signal that is generated while the picture is displayed,
   in response to the key input signal, display a message input window including an icon corresponding to the picture, and
   transmit a message including the displayed picture, wherein the message is generated by using the message input window;
   a display unit which outputs the message input window; and
   a communication module which transmits the message including the displayed picture.

2. The portable device of claim 1, wherein the message input window comprises at least one of:
   a short message input window for a short message;
   a multimedia message input window for a multimedia message; and
   an instant message input window for an instant massage.

3. The portable device of claim 1, wherein the controller is further configured to:
   activate a message application based on the key input signal;
   generate a message based on the key input signal; and
   control the communication module to transmits the message.

4. The portable device of claim 1, wherein the controller is configured to activate at least one of a short message input window, a multimedia message input window, and an instant message input window according to a setting, if the key input signal is generated, while a stand-by screen application is activated.

5. The portable device of claim 4, wherein the controller is further configured to: output a character corresponding to the key input signal inputted from the input unit to the message input window, and automatically output the character to a screen where a selected item is activated.

6. The portable device of claim 1, wherein the portable device comprises:
   a first assembly which includes at least one of the input unit, the controller, a storage unit, and the display unit; and
   a second assembly which faces the first assembly and is arranged to slide in a given direction.

7. The portable device of claim 1, wherein the display unit displays an icon for activating the key map for supporting the touch event.

8. The portable device of claim 1, wherein the controller is further configured to output a character inputted from an input unit to a rear side of an image, if the key input signal is generated while an image search application is activated.

9. The portable device of claim 1, wherein the controller is configured to output a simple input window to one side of a scheduler screen, if a specific date is designated while a scheduler application is activated, and the key input signal is generated while a schedule exists in a corresponding date.

10. The portable device of claim 1, wherein the controller is configured to output an input window for inputting a schedule, if a specific date is designated while a scheduler application is activated, and the key input signal is generated while a schedule does not exist in a corresponding date.

11. The portable device of claim 1, wherein the controller is configured to output a message input window for writing a message on a menu screen, if the key input signal is generated while a menu application is activated.

12. The portable device of claim 1, wherein the controller is configured to output a message input window including a collected image, if an image of subject is collected and the key input signal is generated while a camera application is activated.

13. A method of providing a message service, the method comprising:
displaying image files;
activating a photograph search application while the image files are displayed;
detecting whether at least one of a first key input signal and a sliding sensor signal is generated while the photograph search application is activated;
displaying, in response to at least one of the first input signal and the sliding sensor signal, a simple input window set according to an environment of the photograph search application;
displaying inputted character corresponding to a second key input signal to the simple input window; and
displaying a message input window including the inputted character and an icon corresponding to a designated one of the image files, if a third input signal is generated in while the photograph search application program is activated.

14. The method of claim 13, wherein, in displaying the message input window, a collected image is included in the message input window as an attachment file, if an image of subject is collected while a camera application is activated and at least one of the first key input signal and the sliding sensor signal is generated.

15. The method of claim 13, wherein generating the first key input signal comprises one of:
selecting a specific key included in a keypad and
displaying a key map on a display unit, and generating a specific key input signal according to a touch event generated on the key map.

16. The method of claim 13, wherein generating the first key input signal comprises:
activating an icon for activation of a key map; displaying the key map to a display unit; and
generating a specific key input signal according to a touch event if the touch event is generated on the key map.

17. A method of providing a message service, the method comprising:
activating a scheduler application;
displaying a scheduler screen including a calendar corresponding to a specific month in response to the activation of the scheduler application;
detecting whether at least one of a first key input signal and a sliding sensor signal is generated while the scheduler application is activated; and
displaying, in response to at least one of the first key input signal and the sliding sensor signal, a simple input window set according to an environment of the scheduler application;
displaying an inputted character corresponding to a second key input signal in the simple input window; and
displaying a message input window including the inputted character and a schedule corresponding to a designated date in the specific month, if a third input signal is generated while the scheduler application is activated.

18. The method of claim 17, wherein displaying the simple input window comprises:
displaying the simple input window to one side of the scheduler screen if at least one of the first key input signal and the sliding sensor signal is generated; and
displaying a message input window, if at least one of the first key input signal and the sliding sensor signal is generated.

19. The method of claim 17, wherein displaying the message input window further comprises at least one of:
displaying the message input window on a menu screen, if at least one of the first key input signal and the sliding sensor signal is generated while a menu application is activated; and
displaying the inputted character to a screen where a selected item is activated, if the inputted character is outputted to the simple input window and one item in the menu is selected.

20. The method of claim 19, further comprising:
collecting a touch event according to touch operation which is generated in a display unit; and
selecting a menu matched with the touch event.

21. A portable device that provides a message service function, the portable device comprising:
a slide sensor which generates a sliding sensor signal according to a motion of a component of the portable device;
a controller configured to:
display, on a display unit, of at least one picture,
detects the sliding sensor signal that is generated while the picture is displayed,
in response to the sliding sensor signal, display a message input window including an icon corresponding to the picture, and
transmit a message including the displayed picture, wherein the message is generated by using the message input window;
a display unit which outputs the message input window; and
a communication module which transmits the message including the displayed picture.

22. The portable device of claim 21, wherein the controller is configured to:
activate at least one of a short message input window, a multimedia message input window, and an instant message input window according, if the sliding sensor signal is generated and a standby screen application is active.

23. The portable device of claim 21, wherein the controller is configured to:
output a character corresponding to a key input signal inputted from an input unit to the message input window, and automatically output the character to a screen where a selected item is activated if a menu item is selected.

24. The portable device of claim 21, wherein the controller is further configured to display an icon for activating a key map for supporting a touch event.

25. A method of providing a message service, the method comprising:
displaying a photograph;
activating a photograph search application while the photograph is displayed;

detecting whether at least one of a first key input signal and a sliding sensor signal is generated while the photograph search application is activated;

displaying, in response to the generating of at least one of the first input signal and the sliding sensor signal, a simple input window;

displaying inputted character corresponding to a second key input signal to the simple input window; and displaying a message input window including the inputted character and an icon corresponding to the photograph if a third input signal is generated while the photograph search application is activated.

* * * * *